(12) United States Patent
Kozuma et al.

(10) Patent No.: US 10,559,978 B2
(45) Date of Patent: *Feb. 11, 2020

(54) SYSTEM, APPARATUS AND METHOD FOR SUPPLYING ELECTRIC POWER, APPARATUS AND METHOD FOR RECEIVING ELECTRIC POWER

(71) Applicant: SONY CORPORATION, Tokyo (JP)

(72) Inventors: Yosuke Kozuma, Tokyo (JP); Shinpei Nishikawa, Tokyo (JP); Shinji Kimura, Tokyo (JP); Yusuke Hori, New York, NY (US); Goro Mikano, Kanagawa (JP); Yuuki Iwasaki, Tokyo (JP); Shigetoshi Onitsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,763

(22) Filed: Nov. 14, 2017

(65) Prior Publication Data

US 2018/0069422 A1 Mar. 8, 2018

Related U.S. Application Data

(63) Continuation of application No. 13/887,017, filed on May 3, 2013, now Pat. No. 9,847,664, which is a
(Continued)

(30) Foreign Application Priority Data

Mar. 3, 2005 (JP) .................................. 2005-059747

(51) Int. Cl.
*H02J 7/02* (2016.01)
*H02J 50/10* (2016.01)
*H02J 50/80* (2016.01)

(52) U.S. Cl.
CPC .............. *H02J 50/10* (2016.02); *H02J 7/025* (2013.01); *H02J 50/80* (2016.02); *Y10T 307/50* (2015.04)

(58) Field of Classification Search
CPC .. H02J 7/025; H02J 50/10; H02J 5/005; H02J 50/80; Y10T 307/50
See application file for complete search history.

(56) References Cited

U.S. PATENT DOCUMENTS 5,600,225 A 2/1997 Goto
5,734,254 A 3/1998 Stephens
(Continued)

FOREIGN PATENT DOCUMENTS

JP 06-133476 A 5/1994
JP 2001-309579 A 11/2001
(Continued)

OTHER PUBLICATIONS

Hatanaka, et al., "Excited Composition of Primary Side in a Position-Free Contactless Power Station System", Journal of the Magnetics Society of Japan, vol. 26, No. 4, 2002, pp. 580-584.
(Continued)

Primary Examiner — Jared Fureman
Assistant Examiner — Michael J Warmflash
(74) Attorney, Agent, or Firm — Michael Best & Friedrich LLP

(57) ABSTRACT

An electric power supply system includes an electric power reception apparatus and an electric power supply apparatus adapted to supply electric power to the electric power reception apparatus when the electric power reception apparatus is placed on the electric power supply apparatus. The electric power supply apparatus includes a plurality of electric power supply units adapted to supply electric power by electromagnetic induction to the electric power reception
(Continued)

apparatus. A selection unit of the electric power supply apparatus selects, from the total plurality of electric power supply units, a plurality of electric power supply units whose location corresponds to a position where the electric power reception apparatus is placed, and a control unit controls the supply of electric power such that electric power is supplied to the electric power reception apparatus from the selected plurality of electric power supply units.

15 Claims, 11 Drawing Sheets

Related U.S. Application Data continuation of application No. 13/546,400, filed on Jul. 11, 2012, now Pat. No. 8,446,251, which is a continuation of application No. 12/683,289, filed on Jan. 6, 2010, now Pat. No. 8,222,991, which is a continuation of application No. 11/592,960, filed on Nov. 6, 2006, now Pat. No. 7,733,215, which is a continuation of application No. 11/365,933, filed on Mar. 2, 2006, now abandoned.

(56) References Cited

U.S. PATENT DOCUMENTS

| | | | |
|---|---|---|---|
| 5,889,384 A | 3/1999 | Hayes et al. | |
| 6,028,413 A * | 2/2000 | Brockmann | H02J 7/025 320/108 |
| 6,075,433 A * | 6/2000 | Ono | H01F 38/14 336/212 |
| 6,100,663 A | 8/2000 | Boys et al. | |
| 6,317,337 B1 | 11/2001 | Yasumura | |
| 6,756,697 B2 * | 6/2004 | Mizutani | B60K 37/02 307/10.1 |
| 6,803,744 B1 | 10/2004 | Sabo | |
| 6,917,182 B2 * | 7/2005 | Burton | H02J 7/025 320/108 |
| 7,084,767 B2 | 8/2006 | Hasegawa et al. | |
| 7,212,414 B2 * | 5/2007 | Baarman | A61L 2/10 363/16 |
| 7,239,110 B2 * | 7/2007 | Cheng | H02J 5/005 320/108 |
| 7,474,717 B2 | 1/2009 | Lindell et al. | |
| 7,504,802 B2 * | 3/2009 | Bersenev | H02J 7/0044 320/108 |
| 7,554,316 B2 * | 6/2009 | Stevens | H02J 5/005 323/355 |
| 7,733,215 B2 * | 6/2010 | Kozuma | H02J 5/005 340/5.61 |
| 8,222,991 B2 | 7/2012 | Kozuma et al. | |
| 8,446,251 B2 | 5/2013 | Kozuma et al. | |
| 2002/0052227 A1 | 5/2002 | Yamatani | |
| 2005/0068019 A1 * | 3/2005 | Nakamura | G06F 1/26 323/355 |
| 2006/0017659 A1 | 1/2006 | Ogawa et al. | |
| 2006/0145881 A1 | 7/2006 | Sakatani et al. | |
| 2006/0276150 A1 | 12/2006 | Ogasawara | |
| 2007/0139000 A1 | 6/2007 | Kozuma et al. | |
| 2008/0099254 A1 | 5/2008 | Katsurahira | |
| 2010/0225172 A1 | 9/2010 | Kozuma et al. | |

FOREIGN PATENT DOCUMENTS

| | | | | |
|---|---|---|---|---|
| JP | 2003-153457 A | | 5/2003 | |
| JP | 2003153457 A | * | 5/2003 | |
| JP | 2003-224937 A | | 8/2003 | |
| JP | 2003224937 A | * | 8/2003 | |
| WO | WO-2014030287 A1 | * | 2/2014 | H02J 5/005 |

OTHER PUBLICATIONS

English Language Translation of Notification of Reasons for Refusal for JP Patent Application No. 2005-059747, dated Jul. 24, 2008.
Non Final Office Action for U.S. Appl. No. 13/887,017, dated Mar. 25, 2016, 11 pages.
Final Office Action for U.S. Appl. No. 13/887,017, dated Aug. 25, 2016, 12 pages.
Non Final Office Action for U.S. Appl. No. 13/887,017, dated Dec. 7, 2016, 12 pages.
Final Office Action for U.S. Appl. No. 13/887,017, dated Jun. 2, 2017, 07 pages.
Advisory Action for U.S. Appl. No. 13/887,017, dated Nov. 2, 2016, 07 pages.
Notice of Allowance for U.S. Appl. No. 13/887,017, dated Aug. 7, 2017, 08 pages.
Non Final Office Action for U.S. Appl. No. 13/645,400, dated Aug. 25, 2015, 13 pages.
Non Final Office Action for U.S. Appl. No. 12/683,289, dated Nov. 14, 2011, 07 pages.
Notice of Allowance for U.S. Appl. No. 12/683,289, dated Mar. 20, 2012, 05 pages.
Non Final Office Action for U.S. Appl. No. 11/592,960, dated Oct. 6, 2009, 06 pages.
Notice of Allowance for U.S. Appl. No. 11/592,960, dated Feb. 5, 2010, 07 pages.

* cited by examiner

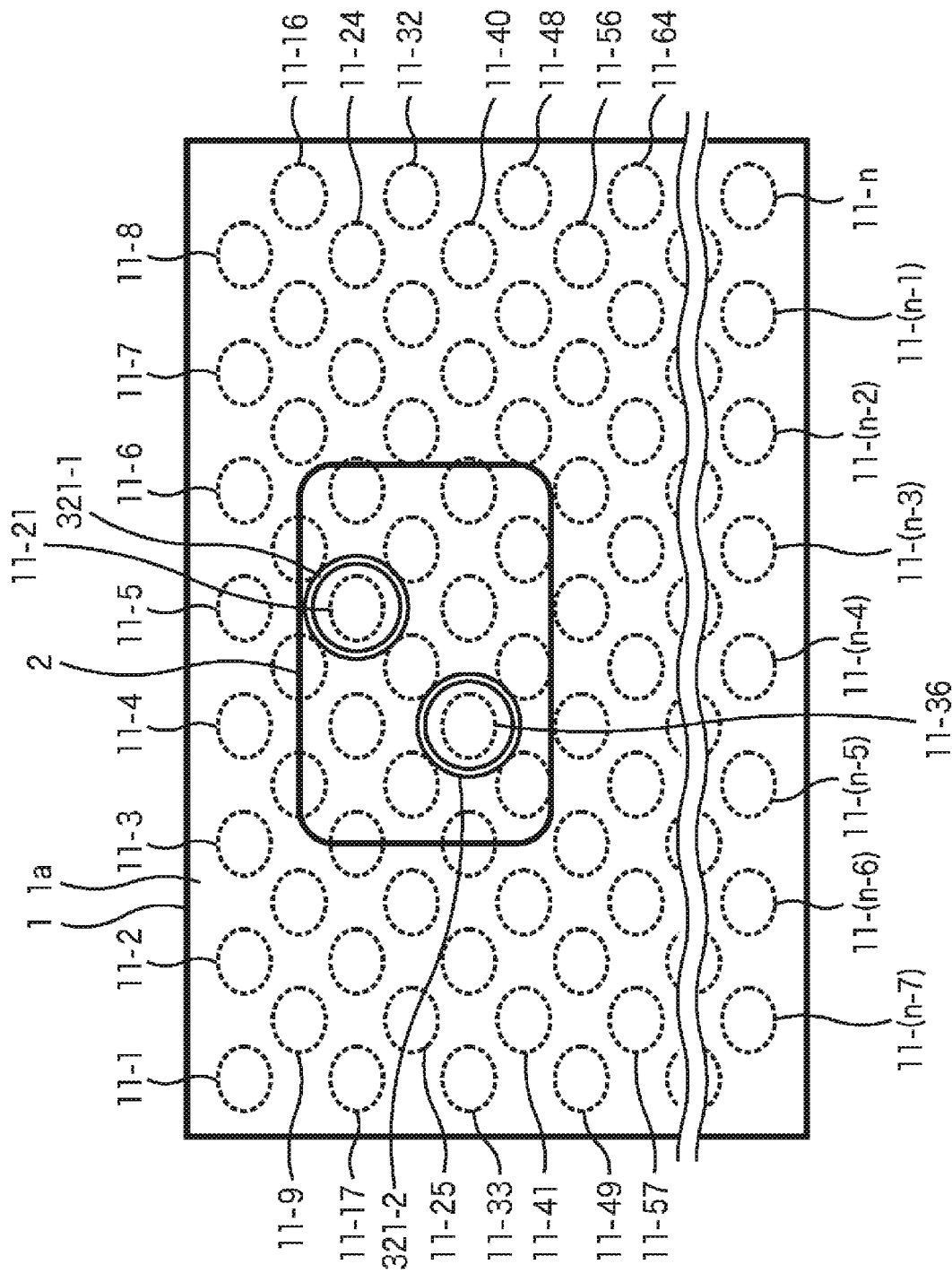

SYSTEM, APPARATUS AND METHOD FOR SUPPLYING ELECTRIC POWER, APPARATUS AND METHOD FOR RECEIVING ELECTRIC POWER

CROSS REFERENCES TO RELATED APPLICATIONS

The present application is a continuation of U.S. patent application Ser. No. 13/887,017 filed May 3, 2013, which is a continuation of U.S. patent application Ser. No. 13/546, 400 filed Jul. 11, 2012 (now U.S. Pat. No. 8,446,251), which is a continuation of U.S. patent application Ser. No. 12/683, 289 filed Jan. 6, 2010 (now U.S. Pat. No. 8,222,991), which is a continuation application of U.S. patent application Ser. No. 11/592,960 filed Nov. 6, 2006 (now U.S. Pat. No. 7,733,215), which is a continuation application of U.S. patent application Ser. No. 11/365,933, filed Mar. 2, 2006 (now abandoned), and which claims the benefit of priority from Japanese Patent Application JP 2005-059747, filed in the Japanese Patent Office on Mar. 3, 2005, the entire contents of which are incorporated herein by reference.

BACKGROUND OF THE INVENTION

1. Field of the Invention

The present invention relates to a system, apparatus and method for supplying electric power, an apparatus and a method for receiving electric power, a storage medium and a program, and more particularly to a system, apparatus and method for supplying electric power, an apparatus and a method for receiving electric power, a storage medium and a program, that allow it to supply electric power to an electric power reception apparatus in an easy and efficient manner.

2. Description of the Related Art

In many electronic devices such as a PDA (Personal Digital Assistance) device or a digital portable telephone, a battery is charged such by supplying electric power to the battery from an AC adapter connected via a plug to an AC power source. That is, electric power is supplied to a battery of an electronic device from a power source via a power supply cable.

It has been proposed to wirelessly supply electric power to an electronic device from an electric power supply apparatus without using a power supply cable. For example, Japanese Unexamined Patent Application Publication No. 6-133476 discloses a technique of supplying electric power by electromagnetically inducing a current in an electromagnetic induction coil of a power receiver system from an electromagnetic induction coil of a master system.

In a technique disclosed in Japanese Unexamined Patent Application Publication No. 2003-224937, an electric power supply apparatus has a plurality of electric power supply coils. The electric power supply apparatus sequentially selects one of electric power supply coils and passes a current through the selected coil. In an electric power reception apparatus placed on a placement surface of the electric power supply apparatus, one electric power reception coil and one identification tag coil receive an electromagnetic wave generated by the electric power supply coil, and electromotive force is induced in the electric power reception coil and the identification tag coil. In response, an ID is transmitted from the identification tag coil to the electric power supply apparatus. If the electric power supply apparatus receives the ID, the electric power supply apparatus stores the ID together with the index of the electric power supply coil that are being used. In the following operation, passing of the current through the electric power supply coil is controlled in accordance with the stored information.

SUMMARY OF THE INVENTION

In the known electric power supply system, electric power is supplied from a particular one of power supply coils of the electric power supply apparatus to the electric power reception coil of the electric power reception apparatus, and thus it takes a long time to completely charge the battery.

In view of the above, it is desirable to provide a technique of supplying electric power to an electric power reception apparatus to quickly charge a battery.

According to an embodiment of the present invention, there is provided an electric power supply system including an electric power supply apparatus and an electric power reception apparatus, wherein the electric power supply apparatus includes a plurality of electric power supply means for supplying electric power by electromagnetic induction to the electric power reception apparatus, a selection means for selecting, from a total plurality of electric power supply means, a plurality of electric power supply means whose location corresponds to a position where the electric power reception apparatus is placed, a receiving means for receiving control information for controlling the supply of the electric power, the control information being wirelessly transmitted from the electric power reception apparatus, and a control means for controlling the supply of the electric power according to the control information such that the electric power is supplied to the electric power reception apparatus from the selected plurality of electric power supply means, and wherein the electric power reception apparatus includes an electric power reception means for receiving the electric power supplied by the electromagnetic induction from the selected plurality of electric power supply means, and a transmitting unit for wirelessly transmitting the control information when the supply of electric power by the electromagnetic induction from the selected plurality of electric power supply means is received.

According to an embodiment of the present invention, there is provided an electric power supply apparatus including a plurality of electric power supply means for supplying electric power by electromagnetic induction to the electric power reception apparatus, a selection means for selecting, from a total plurality of electric power supply means, a plurality of electric power supply means whose location corresponds to a position where the electric power reception apparatus is placed, a communication means for receiving control information for controlling the supply of the electric power, the control information being wirelessly transmitted from the electric power reception apparatus, and a control means for controlling the supply of the electric power according to the control information such that the electric power is supplied to the electric power reception apparatus from the selected plurality of electric power supply means.

The control means may transmit and receive information to or from the electric power reception apparatus via the communication means to authenticate the electric power reception apparatus.

The selection means may select electric power supply means such that if the communication means receives, from the electric power reception apparatus, information notifying that the electric power reception apparatus has received electric power in response to a magnetic field sequentially generated by the plurality of electric power supply means, the selection means selects the electric power supply means, which was generating the magnetic field at the point of time at which the communication means received the information, as the electric power supply means at the location corresponding to the location where the electric power reception apparatus is placed.

The electric power supply apparatus may further include a detection means for detecting an overcurrent that flows through an electric power supply means when the electric power supply means generates the magnetic field, and the selection means may make a selection such that if an overcurrent is detected by the detection means before the communication means receives information indicating that electric power has been supplied, the selection means does not select the electric power supply means through which the detected overcurrent is flowing.

According to an embodiment of the present invention, there is provided an electric power supply method including the steps of selecting, from a total plurality of electric power supply units, a plurality of electric power supply units whose location corresponds to a position where the electric power reception apparatus is placed, receiving control information for controlling the supply of electric power, the control information being wirelessly transmitted from the electric power reception apparatus, and controlling the supply of the electric power according to the control information such that the electric power is supplied to the electric power reception apparatus from the selected plurality of electric power supply units.

According to an embodiment of the present invention, there is provided a storage medium in which a program is stored, the program including the steps of selecting, from a total plurality of electric power supply units, a plurality of electric power supply units whose location corresponds to a position where the electric power reception apparatus is placed, receiving control information for controlling the supply of electric power, the control information being wirelessly transmitted from the electric power reception apparatus, and controlling the supply of the electric power according to the control information such that the electric power is supplied to the electric power reception apparatus from the selected plurality of electric power supply units.

According to an embodiment of the present invention, there is provided a program for use by a computer to execute a process including the steps of selecting, from a total plurality of electric power supply units, a plurality of electric power supply units whose location corresponds to a position where the electric power reception apparatus is placed, receiving control information for controlling the supply of electric power, the control information being wirelessly transmitted from the electric power reception apparatus, and controlling the supply of the electric power according to the control information such that the electric power is supplied to the electric power reception apparatus from the selected plurality of electric power supply units.

According to an embodiment of the present invention, there is provided an electric power reception apparatus including at least one electric power reception means for receiving electric power supplied by electromagnetic induction from a plurality of electric power supply units, and a transmitting unit for wirelessly transmitting control information for controlling the supply of the electric power to an electric power supply apparatus when the electric power is supplied by electromagnetic induction from the electric power supply units.

According to an embodiment of the present invention, there is provided an electric power reception method including the steps of receiving electric power supplied by electromagnetic induction from a plurality of electric power supply units, and wirelessly transmitting control information for controlling the supply of the electric power to an electric power supply apparatus when the electric power is supplied by electromagnetic induction from the electric power supply units.

In the electric power supply system described above, the electric power supply apparatus supplies electric power such that a plurality of electric power supply means supply electric power by electromagnetic induction to the electric power reception apparatus, the selection means selects, from the total plurality of electric power supply means, a plurality of electric power supply means whose location corresponds to the position where the electric power reception apparatus is placed, the communication means receives control information for controlling the supply of the electric power, the control information being wirelessly transmitted from the electric power reception apparatus, and the control means controls the supply of the electric power according to the control information such that the electric power is supplied to the electric power reception apparatus from the selected plurality of electric power supply means, and the electric power reception apparatus receives electric power such that the electric power reception means receives the electric power supplied by the electromagnetic induction from the selected plurality of electric power supply means, and the transmitting unit wirelessly transmits the control information when the supply of electric power by the electromagnetic induction from the selected plurality of electric power supply means is received.

In the electric power supply apparatus, the electric power supply method, the storage medium on which the program is stored, and the program, described above, a plurality of electric power supply units whose location corresponds to a position where the electric power reception apparatus is placed are selected from the total plurality of electric power supply units, control information is received which is information for controlling the supply of the electric power and which is wirelessly transmitted from the electric power reception apparatus, and the supply of the electric power is controlled according to the control information such that the electric power is supplied to the electric power reception apparatus from the selected plurality of electric power supply units.

In the electric power reception apparatus and the electric power reception method described above, electric power is supplied by electromagnetic induction from a plurality of electric power supply units, and control information for controlling the supply of the electric power is transmitted to the electric power supply apparatus when the electric power is supplied by electromagnetic induction from the electric power supply units.

The present invention provides the advantage that electric is power is supplied to an electric power reception apparatus in a quick manner.

BRIEF DESCRIPTION OF THE DRAWINGS

FIG. 11 is diagram showing another example of a construction of an electric power reception unit of an electric power reception apparatus.

DESCRIPTION OF THE PREFERRED EMBODIMENTS

Before embodiments of the present invention are described, correspondence between specific examples of parts/steps in the embodiments and those in the respective claims is described. This description is intended to assure those embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 1:
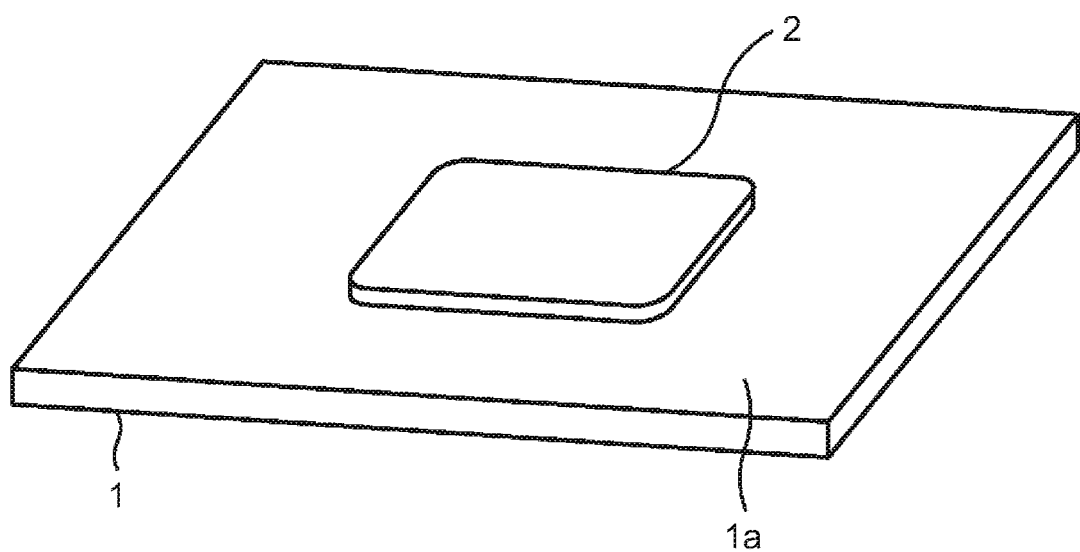
FIG. 1 is a perspective view showing an example of a construction of a power supply system according to an embodiment of the present invention.
Figure 3:
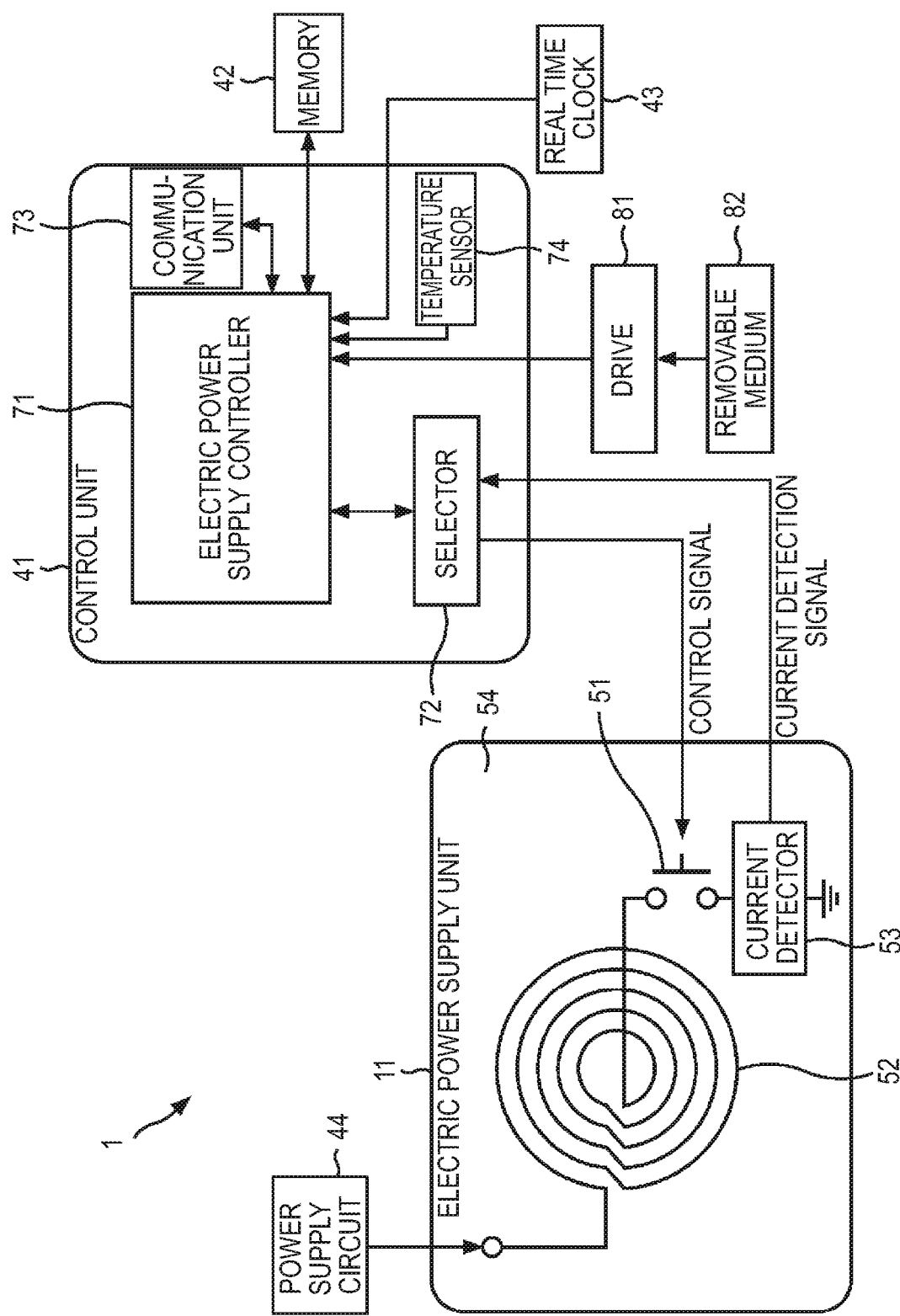
FIG. 3 is a block diagram showing an example of a construction of the electric power supply apparatus shown in FIG. 1.

According to an embodiment of the present invention there is provided an electric power supply system including at least one electric power reception apparatus and an electric power supply apparatus adapted to supply electric power to the at least electric power reception apparatus, wherein the electric power supply apparatus (for example, an electric power supply apparatus 1 shown in FIG. 1) includes a plurality of electric power supply means (for example, electric power supply units 11 shown in FIG. 3) for supplying electric power by electromagnetic induction to the electric power reception apparatus, a selection means (for example, a selector 72 shown in FIG. 3) for selecting, from the total plurality of electric power supply means, a plurality of electric power supply means whose location corresponds to a position where the electric power reception apparatus is placed, a receiving means (for example, a communication unit 73 shown in FIG. 3) for receiving control information for controlling the supply of the electric power, the control information being wirelessly transmitted from the electric power reception apparatus, and a control means (for example, an electric power supply controller 71 shown in FIG. 3) for controlling the supply of the electric power according to the control information such that the electric power is supplied to the electric power reception apparatus from the selected plurality of electric power supply means, and wherein the electric power reception apparatus (for example, an electric power reception apparatus 2 shown in FIG. 1) includes an electric power reception means (for example, an electric power reception unit 21 shown in FIG. 4) for receiving the electric power supplied by the electromagnetic induction from the selected plurality of electric power supply means, and a transmitting unit (for example, a communication unit 107 shown in FIG. 4) for wirelessly transmitting the control information when the supply of electric power by the electromagnetic induction from the selected plurality of electric power supply means is received.

According to an embodiment of the invention, there is provided an electric power supply apparatus (for example, an electric power supply apparatus 1 shown in FIG. 1) adapted to supply electric power to at least one electric power reception apparatus, the electric power supply apparatus including a plurality of electric power supply means (for example, electric power supply units 11 shown in FIG. 3) for supplying electric power by electromagnetic induction to the electric power reception apparatus, a selection means (for example, a selector 72 shown in FIG. 3) for selecting, from the total plurality of electric power supply means, a plurality of electric power supply means whose location corresponds to a position where the electric power reception apparatus is placed, a communication means (for example, a communication unit 73 shown in FIG. 3) for receiving control information for controlling the supply of the electric power, the control information being wirelessly transmitted from the electric power reception apparatus, and a control means (for example, an electric power supply controller 71 shown in FIG. 3) for controlling the supply of the electric power according to the control information such that the electric power is supplied to the electric power reception apparatus from the selected plurality of electric power supply means.

The electric power supply apparatus may further include a detection means (for example, a current detector 53 shown in FIG. 3) for detecting an overcurrent that flows through an electric power supply means when the electric power supply means generates a magnetic field, and the selection means may make a selection such that if an overcurrent is detected by the detection means before the communication means receives information indicating that electric power has been supplied, the selection means does not select the electric power supply means through which the detected overcurrent is flowing.

Figure 8:
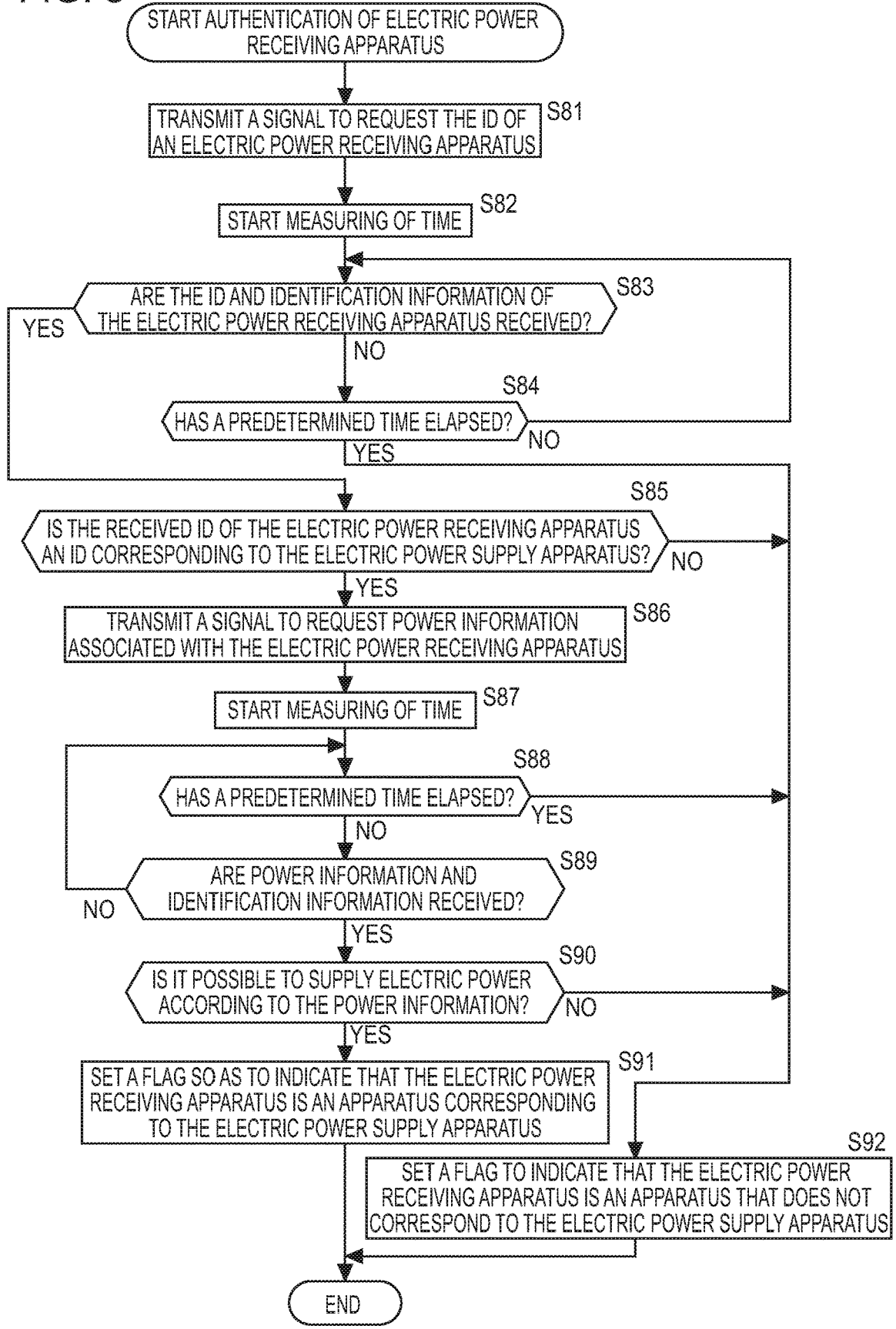
FIG. 8 is a flow chart illustrating a process of authenticating an electric power reception apparatus.
Figure 9:
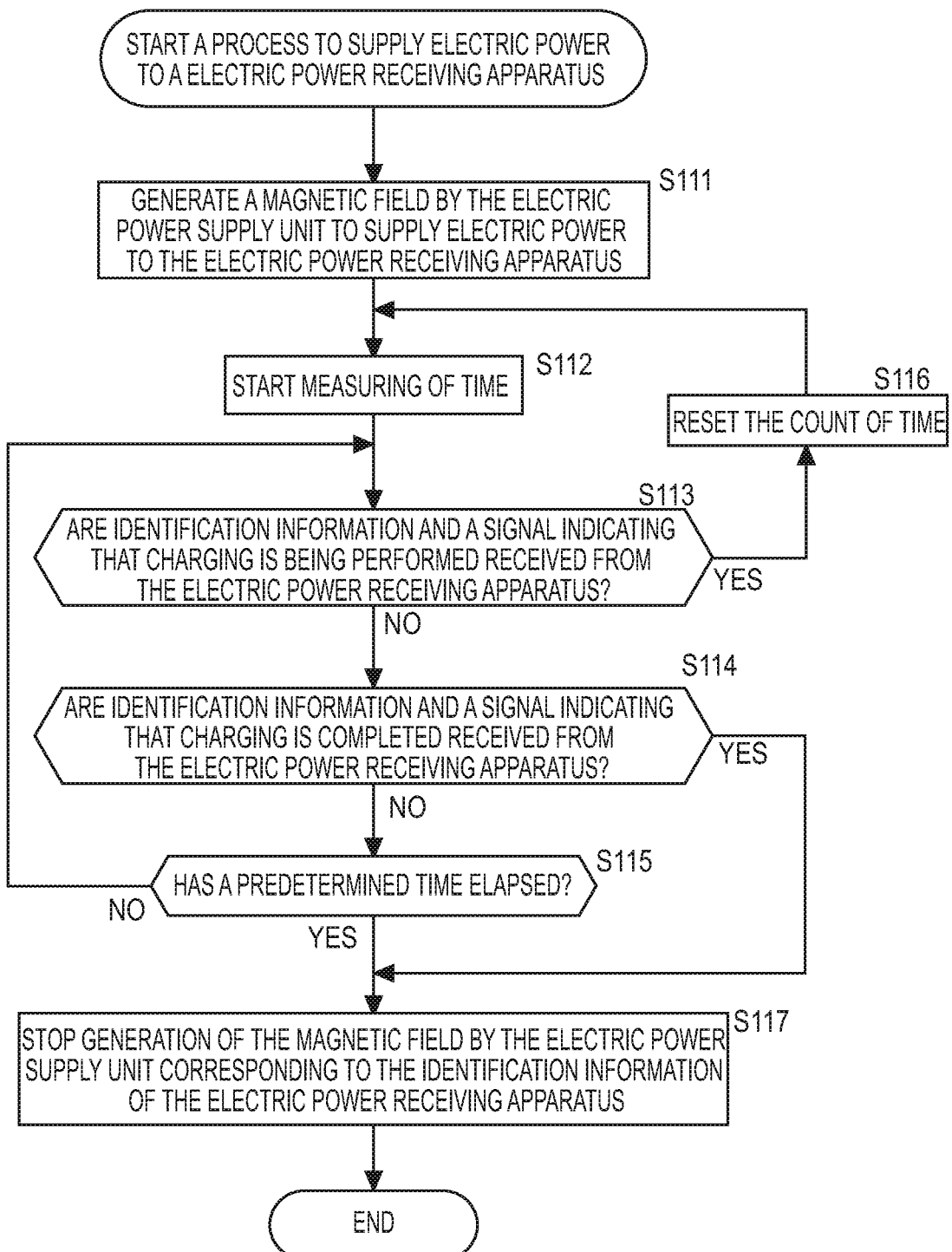
FIG. 9 is a flow chart illustrating a process of supplying electric power to an electric power reception apparatus.

According to an embodiment of the present invention, there is provided an electric power supply method for an electric power supply apparatus (for example, an electric power supply apparatus 1 shown in FIG. 1) including a plurality of electric power supply units (for example, electric power supply units 11 shown in FIG. 2) for supplying electric power by electromagnetic induction to at least one electric power reception apparatus (for example, an electric power reception apparatus 2 shown in FIG. 1) placed on the electric power supply apparatus, the method including the steps of selecting, from a total plurality of electric power supply units, a plurality of electric power supply units whose location corresponds to a position where the electric power reception apparatus is placed (for example, in step S51 shown in FIG. 5), receiving control information for controlling the supply of the electric power, the control information being wirelessly transmitted from the electric power reception apparatus (for example, in step S89 shown in FIG. 8), and controlling the supply of the electric power according to the control information such that the electric power is supplied to the electric power reception apparatus from the selected plurality of electric power supply units (for example, in step S111 shown in FIG. 9).

According to an embodiment of the present invention, there is provided a storage medium in which a computer-readable program is stored, for use to execute an electric power supply process by an electric power supply apparatus (for example, an electric power supply apparatus 1 shown in FIG. 1) including a plurality of electric power supply units (for example, electric power supply units 11 shown in FIG. 2) for supplying electric power by electromagnetic induction to at least one electric power reception apparatus (for example, an electric power reception apparatus 2 shown in FIG. 1) placed on the electric power supply apparatus, the method including the steps of selecting, from a total plurality of electric power supply units, a plurality of electric power supply units whose location corresponds to a position where the electric power reception apparatus is placed (for example, in step S51 shown in FIG. 5), receiving control information for controlling the supply of the electric power, the control information being wirelessly transmitted from the electric power reception apparatus (for example, in step S89 shown in FIG. 8), and controlling the supply of the electric power according to the control information such that the electric power is supplied to the electric power reception apparatus from the selected plurality of electric power supply units (for example, in step S111 shown in FIG. 9).

According to an embodiment of the present invention, there is provided a program for use to execute an electric power supply process by a computer in an electric power supply apparatus (for example, an electric power supply apparatus 1 shown in FIG. 1) including a plurality of electric power supply units (for example, electric power supply units 11 shown in FIG. 2) for supplying electric power by electromagnetic induction to at least one electric power reception apparatus (for example, an electric power reception apparatus 2 shown in FIG. 1) placed on the electric power supply apparatus, the electric power supply process including the steps of selecting, from a total plurality of electric power supply units, a plurality of electric power supply units whose location corresponds to a position where the electric power reception apparatus is placed (for example, in step S51 shown in FIG. 5), receiving control information for controlling the supply of the electric power, the control information being wirelessly transmitted from the electric power reception apparatus (for example, in step S89 shown in FIG. 8), and controlling the supply of the electric power according to the control information such that the electric power is supplied to the electric power reception apparatus from the selected plurality of electric power supply units (for example, in step S111 shown in FIG. 9).

According to an embodiment of the present invention, there is provided an electric power reception apparatus (for example, an electric power reception apparatus 2 shown in FIG. 1) adapted to receive electric power supplied by an electric power supply apparatus (for example, an electric power supply apparatus 1 shown in FIG. 1) including a plurality of electric power supply units (for example, electric power supply units 11 shown in FIG. 2) adapted to supply electric power by electromagnetic induction, the electric power reception apparatus including at least one electric power reception means (for example, an electric power reception unit 21 shown in FIG. 4) for receiving the electric power supplied by electromagnetic induction from the plurality of electric power supply units, and a transmitting unit (for example, a communication unit 107 shown in FIG. 4) for wirelessly transmitting control information for controlling the supply of the electric power to the electric power supply apparatus when the electric power is supplied by electromagnetic induction from the electric power supply units.

Figure 10:
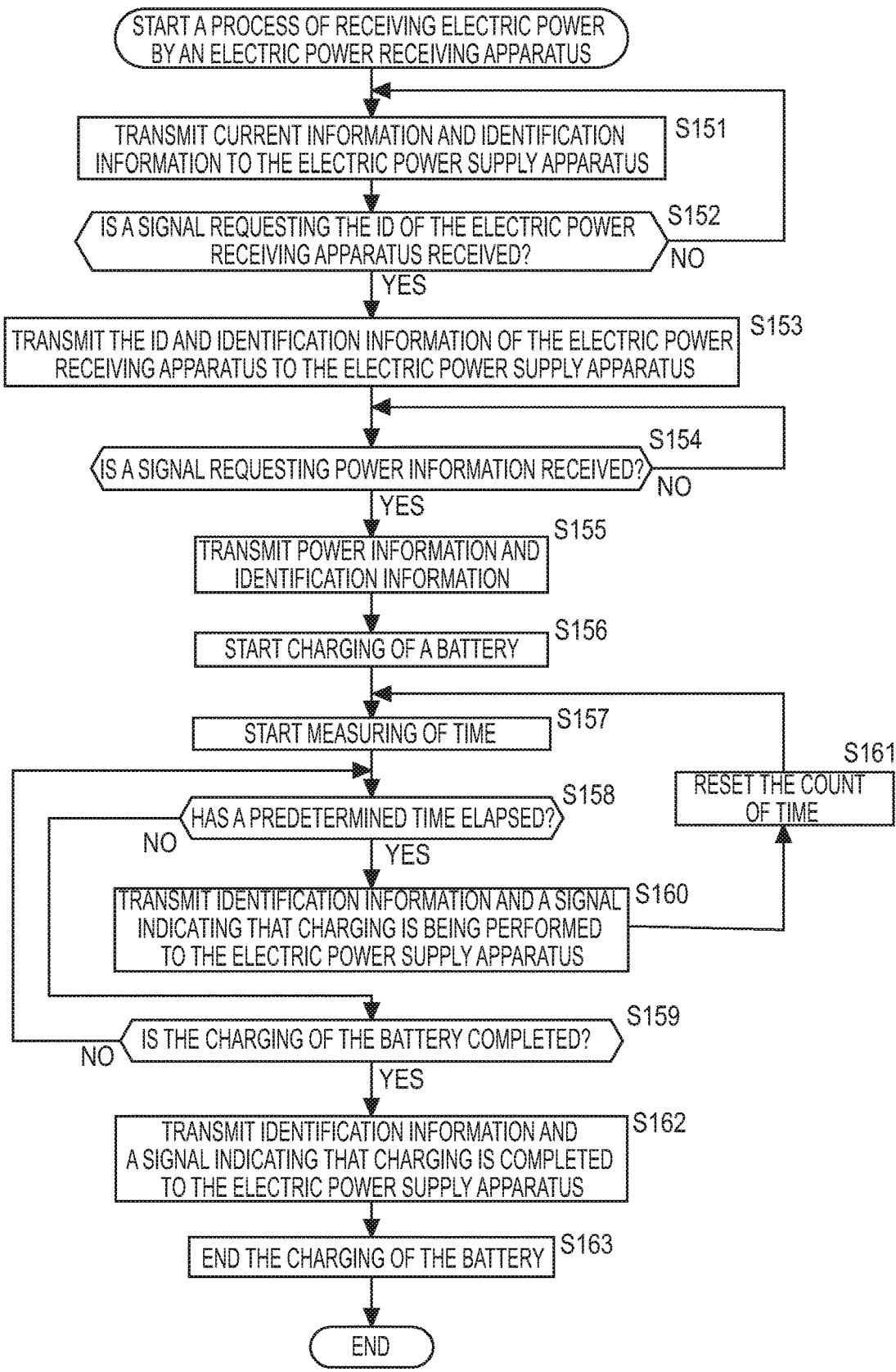
FIG. 10 is a flow cart of a process performed by an electric power reception apparatus to receive electric power.

According to an embodiment of the present invention, there is provided an electric power reception method for an electric power reception apparatus (for example, an electric power reception apparatus 2 shown in FIG. 1) adapted to receive electric power supplied by an electric power supply apparatus (for example, an electric power supply apparatus 1 shown in FIG. 1) including a plurality of electric power supply units (for example, electric power supply units 11 shown in FIG. 2) adapted to supply electric power by electromagnetic induction, the method including the steps of receiving electric power supplied by electromagnetic induction from the plurality of electric power supply units (for example, in step S151 shown in FIG. 10), and wirelessly transmitting control information for controlling the supply of the electric power to the electric power supply apparatus when the electric power is supplied by electromagnetic induction from the electric power supply units (for example, in step S155 shown in FIG. 10).

Embodiments of the present invention are described below with reference to the accompanying drawings.

FIG. 1 is a perspective view showing an example of a construction of an electric power supply system according to an embodiment of the present invention.

This system includes an electric power supply apparatus 1 and an electric power reception apparatus 2. On a surface of the electric power supply apparatus 1, a placement surface 1a is formed using a sheet of material which allows electromagnetic waves to pass through. When the electric power reception apparatus 2 is placed on this placement surface 1a, the electric power supply apparatus 1 wirelessly supplies required electric power to the electric power reception apparatus 2. That is, the electric power supply apparatus 1 supplies electric power to the electric power reception apparatus 2 without using an electric power supply cable.

Examples of the electric power reception apparatus 2 are a notebook-type personal computer, a PDA, a portable telephone, and a PHS (Personal Handyphone System) device, or a battery removable from such a device.

Figure 2:
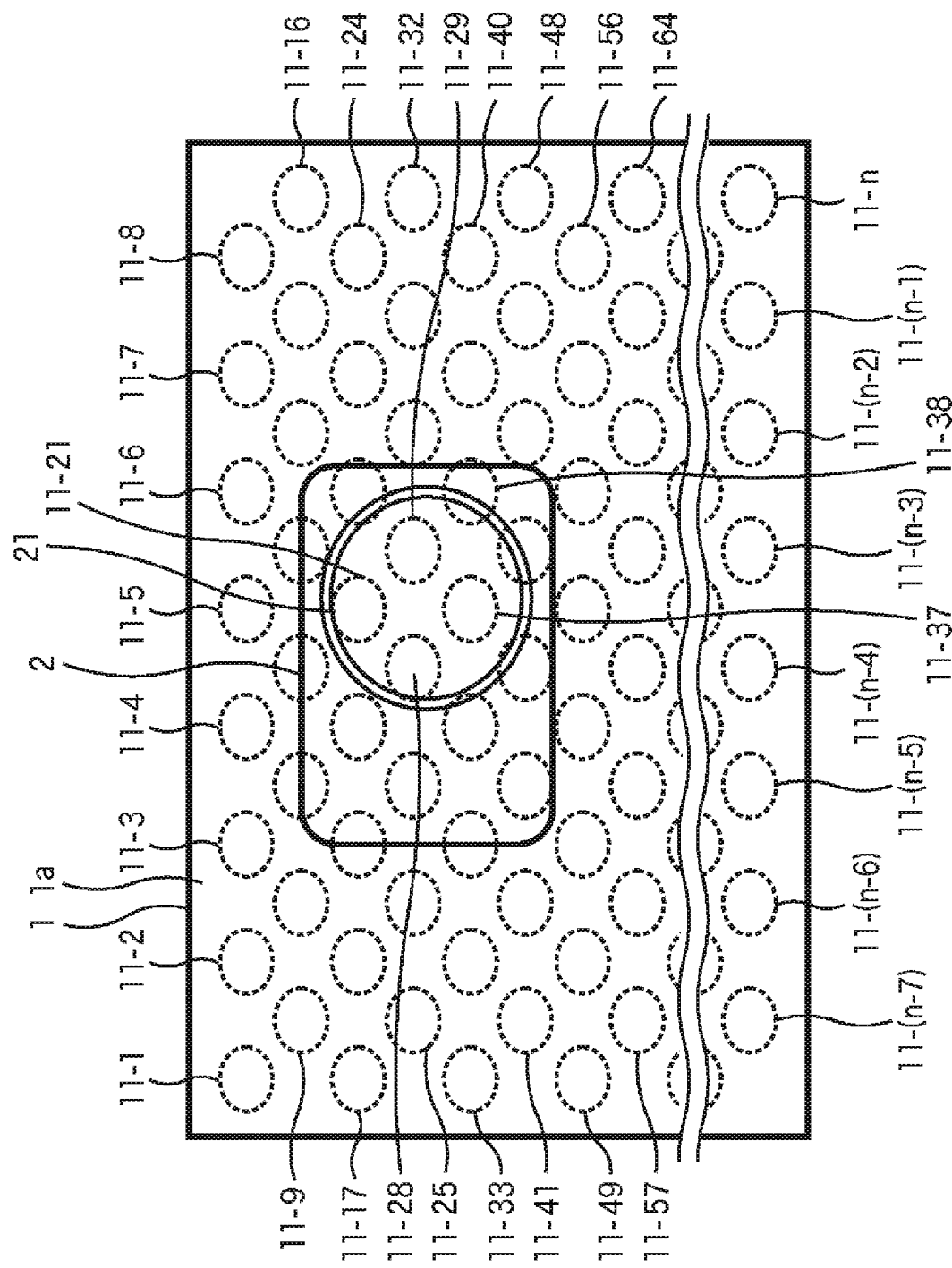
FIG. 2 is a diagram viewed from above and showing the electric power supply apparatus shown in FIG. 1 in a state in which an electric power reception apparatus is placed on a placement surface of the electric power supply apparatus, wherein for the purpose of illustration, lower parts hidden below upper parts are also shown.

FIG. 2 is a diagram viewed from above and showing the electric power supply apparatus 1 and the electric power reception apparatus 2 placed on the placement surface 1a of the electric power supply apparatus 1, wherein for the purpose of illustration, parts hidden below upper parts are also shown. The electric power supply apparatus 1 includes n electric power supply units 11-1 to 11-n adapted to supply electric power to the electric power reception apparatus 2 by electromagnetic induction. The electric power supply units 11-1 to 11-n are arranged, for example, in a checkerboard pattern below the placement surface 1a (behind the page of FIG. 2).

Hereinafter, when it is not necessary to distinguish individual electric power supply units 11-1 to 11-n from each other, they will be referred to simply as electric power supply units 11.

The electric power reception apparatus 2 has an electric power reception unit 21 disposed on the lower surface side (in contact with the placement surface 1a). The electric power reception unit 21 is adapted to receive electric power supplied via electromagnetic induction caused by magnetic fields produced by the plurality of electric power supply units 11.

Figure 4:
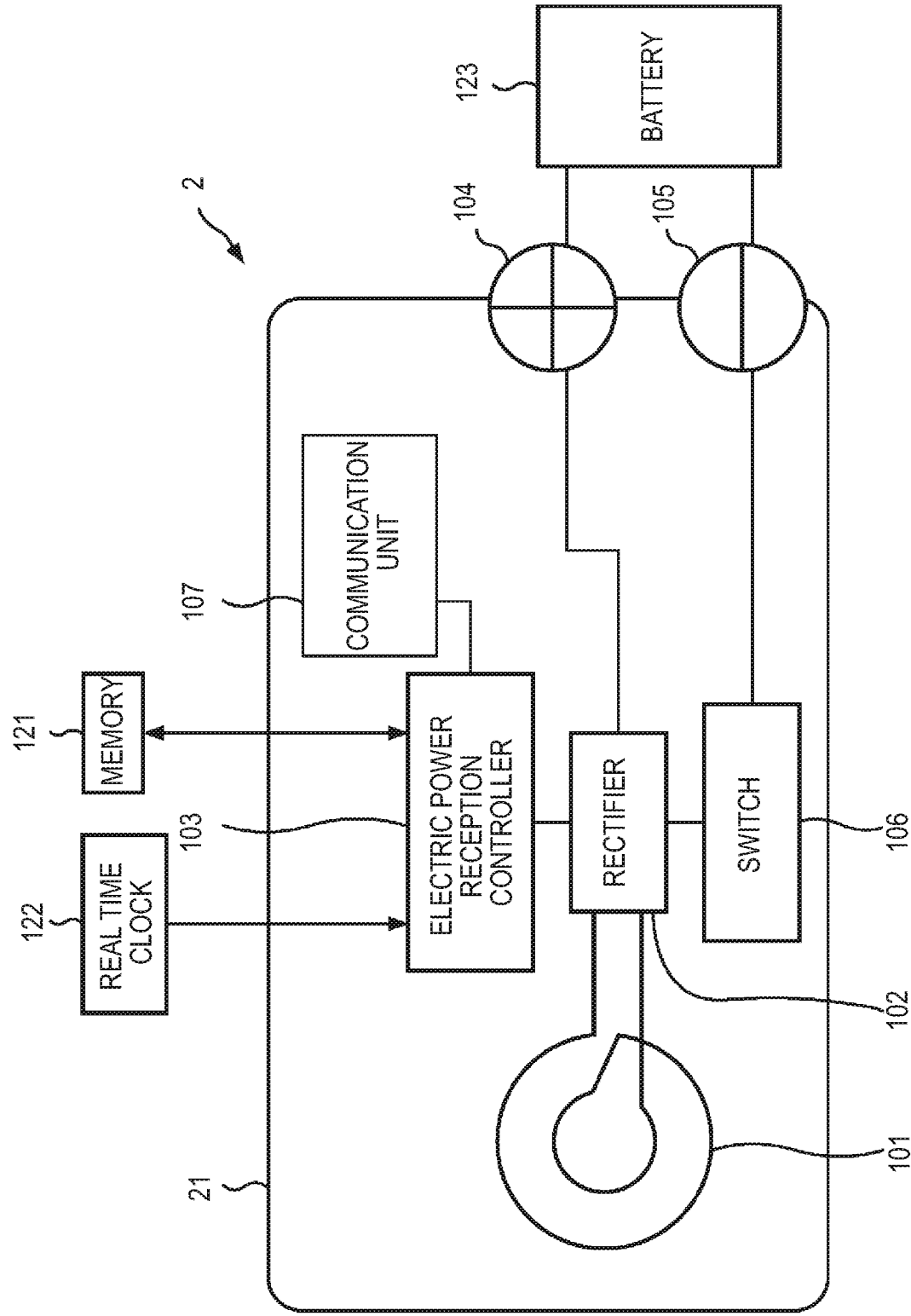
FIG. 4 is a block diagram showing an example of a construction of the electric power reception apparatus shown in FIG. 1.

That is, as shown in FIG. 2, the electric power reception unit 21 (more specifically, an electric power reception antenna 101 shown in FIG. 4) is formed so as to have a size (area) larger than the size (area) of one electric power supply unit 11. In the example shown in FIG. 2, the electric power reception unit 21 of the electric power reception apparatus 2 has a size containing four electric power supply units 11 (an electric power supply unit 11-21, an electric power supply unit 11-28, an electric power supply unit 11-29, and an electric power supply unit 11-37).

FIG. 3 is a block diagram showing an example of a construction of the electric power supply apparatus 1. The electric power supply apparatus 1 includes n electric power supply units 11 (only one of them is shown in FIG. 3), a controller 41, a memory 42, a real time clock 43, and a power supply circuit 44.

The electric power supply unit 11 includes a switch 51, an electric power supply antenna 52, and a current detector 53.

The switch 51 turns on or off in accordance with a control signal supplied from the selector 72 of the controller 41. When the switch 51 is ON, an AC current is supplied to the electric power supply antenna 52 from the power supply circuit 44. The current flowing through the electric power supply antenna 52 generates a magnetic field. In other words, the electric power supply antenna 52 is a coil adapted to generate a magnetic field by a current flowing through the coil.

One end of the current detector 53 is grounded. When the switch 51 is in the on-state, the current detector 53 detects the magnitude of the current flowing through the power supply antenna 52. The current detector 53 supplies a current detection signal corresponding to the detected magnitude of the current to the selector 72 of the controller 41.

The controller 41 includes an electric power supply controller 71, a selector 72, a communication unit 73 and a temperature sensor 74.

The electric power supply controller 71 includes a general-purpose CPU (Central Processing Unit) or a MPU (Micro Processing Unit). The power supply controller 71 stores data into the memory 42 realized by a flash memory or the like, as required. The power supply controller 71 controls the charging operation in accordance with data or a program stored in the memory 42 or a clock pulse generated and supplied by the real time clock 43.

Under the control of the power supply controller 71, the selector 72 supplies a control signal for controlling the turning-on/off of the switch 51 to electric power supply units 11. To the selector 72, a current detection signal indicating current value flowing through electric power supply antenna 52 is supplied from the current detector 53. The selector 72 transfers the received current detection signal to the electric power supply controller 71.

Under the control of the electric power supply controller 71, the communication unit 73 including an antenna and other parts communicates with the electric power reception apparatus 2 using a radio wave or an infrared ray.

The temperature sensor 74 measures the temperature of each of electric power supply units 11-1 to 11-n or the temperature of a part of the placement surface 1a (for example, an area where electric power supply units 11-1 to 11-32, an area where electric power supply units 11-33 to 11-64 are disposed, or an area where electric power supply units 11-65 to 11-n are disposed) and transmits data indicating the measured temperature to the electric power supply controller 71. This allows the electric power supply controller 71 to detect an occurrence of a circuit abnormality such as an electrical leak in electric power supply unit 11. If such an abnormality is detected, the electric power supply controller 71 may turn off all the switches 51.

The power supply circuit 44 directly transfers the AC current supplied via the power cable to the electric power supply unit 11 or the power supply circuit 44 generates an AC current with a predetermined frequency from the AC current supplied via the power cable and supplies the resultant AC current to the electric power supply unit 11.

The electric power supply controller 71 is also connected to a driver 81 as required. A removable storage medium 82 such as a magnetic disk, an optical disk, a magnetooptical disk, or a semiconductor memory is mounted on the drive 81 as required, and a computer program is read from the removable storage medium 82 and installed into the memory 42, as required.

FIG. 4 is a block diagram showing an example of a construction of the electric power reception apparatus 2. The electric power reception apparatus 2 includes an electric power reception unit 21, a memory 121, a real time clock 122, and a battery 123. The electric power reception unit 21 includes an electric power reception antenna 101, a rectifier 102, an electric power reception controller 103, a terminal 104, a terminal 105, a switch 106, and a communication unit 107.

When an AC current flows through the electric power supply antenna 52 of the electric power supply unit 11, this AC current generates a magnetic field that induces an AC current through the electric power reception antenna 101. That is, the electric power reception antenna 101 is a coil through which a current is generated by electromagnetic induction caused by a magnetic field generated by the electric power supply antenna 52.

The electric power reception antenna 101 is formed so as to be greater in size than the electric power supply antenna 52.

The current induced in the electric power reception antenna 101 is supplied to the rectifier 102. The rectifier 102 rectifies the AC current supplied from the electric power reception antenna 101 and generates a DC current. The rectifier 102 supplies the generated DC current as operating power to the electric power reception controller 103. The rectifier 102 supplies a current to the battery 123 via the terminal 104, the terminal 105, and the switch 106 to charge the battery 123.

The electric power reception controller 103 includes a general-purpose CPU (Central Processing Unit) or a MPU (Micro Processing Unit). The electric power reception unit 21 and the battery 123 are, for example, an intelligent battery according to a smart battery standard.

When the current is supplied to the electric power reception controller 103 from the rectifier 102, the electric power reception controller 103 is activated. After the electric power reception controller 103 is activated, the electric power reception controller 103 transmits and receives information to and from the electric power supply apparatus 1 via the communication unit 107. The electric power reception controller 103 turns on the switch 106 and supplies electric power to the battery 123 to charge it.

As required, the electric power reception controller 103 stores data in the memory such as a flash memory 121 or acquires identification information identifying the electric power reception apparatus 2 by reading it from the memory 121. The electric power reception controller 103 also controls the charging operation in accordance with a program stored in the memory 121.

When the charging of the battery 123 is completed, more specifically, when the voltage between the terminal 104 and the terminal 105 reaches a value indicating the completion of the charging of the battery 123, the electric power reception controller 103 turns off the switch 106.

Therefore, if the charging of the battery 123 is completed, the charging current path including the rectifier 102, the terminal 104, the battery 123, the terminal 105, and the switch 106 is cut off, and the charging current no longer flows.

Figure 5:
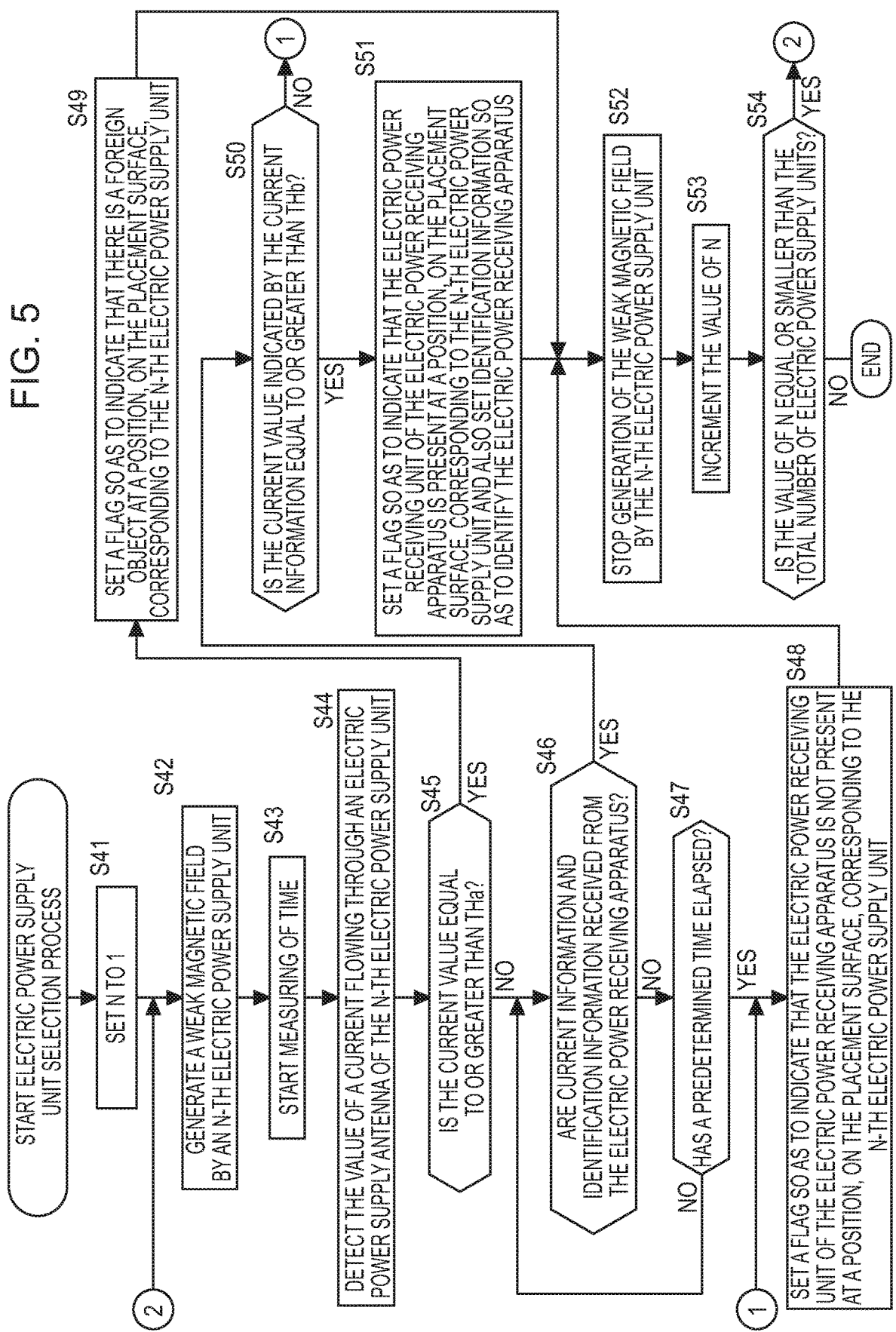
FIG. 5 is a flow chart illustrating a process of selecting an electric power supply unit.

Now, referring to a flow chart shown in FIG. 5, an explanation is given on a process of selecting an electric power supply unit 11 at a location corresponding to the location of the electric power reception unit 21 of the electric power reception apparatus 2 placed on the placement surface 1a. This process is started when the electric power to the electric power supply apparatus 1 is turned on or when the charging of the electric power reception apparatus 2 is completed.

In step S41, the electric power supply controller 71 sets a variable N to 1.

In step S42, under the control of the electric power supply controller 71, the selector 72 forces a N-th electric power supply unit 11 to generate a weak magnetic field. More specifically, the selector 72 supplies an ON control signal to the N-th electric power supply unit 11. In response, the N-th electric power supply unit 11 supplies a current to the electric power supply antenna 52 to generate a weak magnetic field.

Herein, the N-the electric power supply unit 11 is one of electric power supply units 11-1 to 11-n shown in FIG. 2. For example, a first (N=1) electric power supply unit 11 refers to an electric power supply unit 11-1, a second (N=1) electric power supply unit 11 refers to an electric power supply unit 11-2, and a n-th (N=n) electric power supply unit 11 refers to an electric power supply unit 11-n.

In step S43, the electric power supply controller 71 starts a time measurement which is performed by counting clock pulses supplied from the real time clock 43.

In step S44, the current detector 53 detects the value of a current flowing through the electric power supply antenna 52 of the N-th electric power supply unit 11.

In step S45, the electric power supply controller 71 determines whether the current value detected in step S44 is equal to or greater than a threshold value THa. More specifically, the electric power supply controller 71 determines whether the current value indicated by the current detection signal supplied from the current detector 53 is equal to or greater than the threshold value THa.

The determination in step S45, as to whether the value of the current flowing through the electric power supply antenna 52, is made for the following reason.

Figure 6:
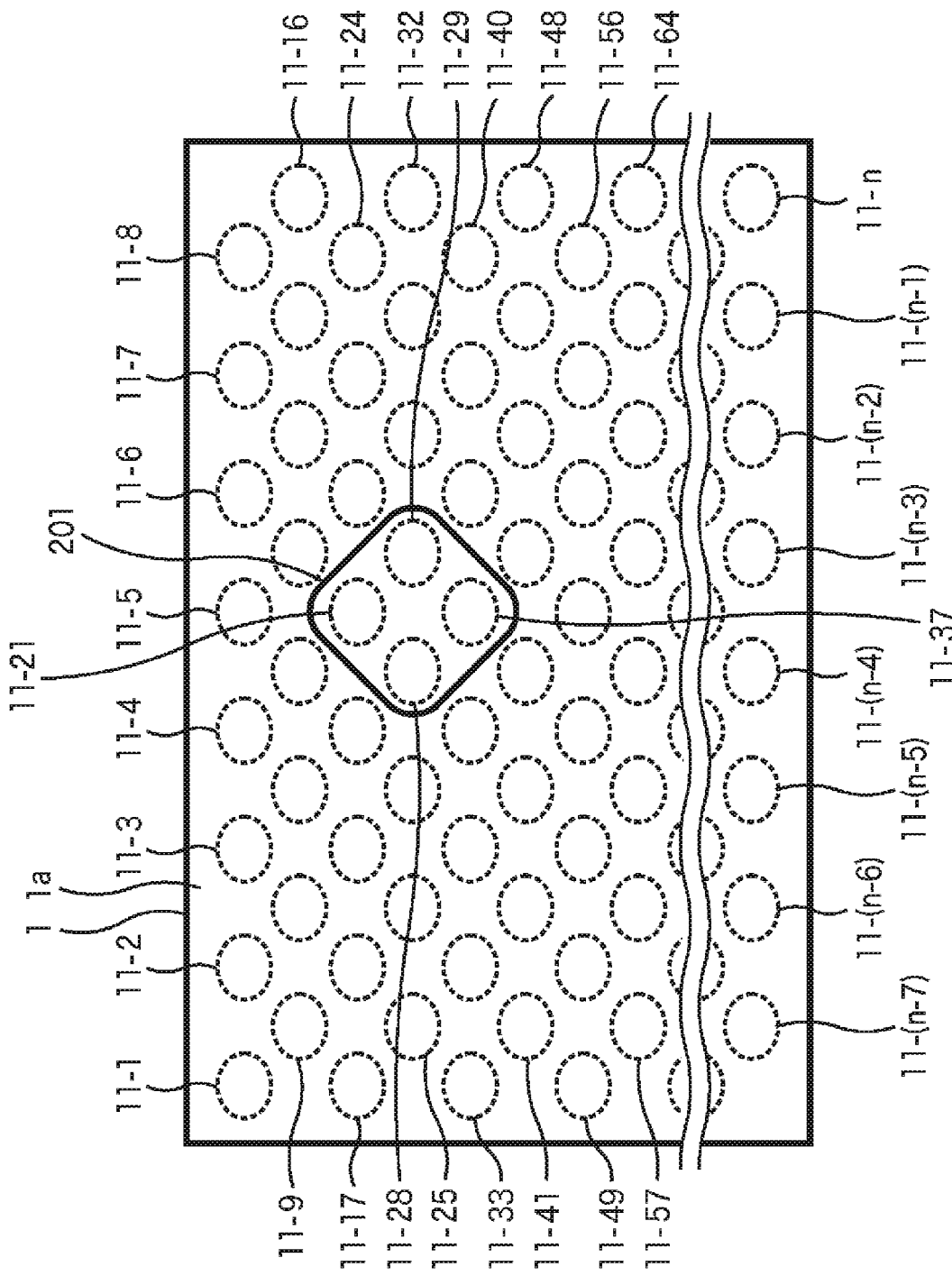
FIG. 6 is a diagram showing a placement surface on which there is a foreign substance.

FIG. 6 is a diagram showing the placement surface 1a on which there is a foreign substance 201. In the example shown in FIG. 6, the foreign substance 201 is located at a position corresponding to the electric power supply unit 11-21, the electric power supply unit 11-28, the electric power supply unit 11-29 and the electric power supply unit 11-37 of the electric power supply apparatus 1.

When the foreign substance 201 is metal and when the N-th electric power supply unit 11 is, for example, the electric power supply unit 11-21, an eddy current is induced in the foreign substance 201 by the magnetic field generated by the electric power supply unit 11-21. When the foreign substance 201 is made of metal, the foreign substance 201 has a low resistance, and thus the eddy current causes the electric power supply antenna 52 of the electric power supply unit 11-21 to have an overcurrent (an eddy current). Besides, the eddy current flowing in the foreign substance 201 causes the foreign substance 201 to be heated.

Thus, the determination in step S45 is made to prevent a current greater than an allowable value from flowing in the electric power supply antenna 52 (see a later-described explanation of step S49).

In a case in which the determination in step S45 is that the current value detected in step S44 is lower than the threshold value THa, then in step S46 the electric power supply controller 71 determines whether the communication unit 73 has received electric power information and identification information, which are transmitted from the electric power reception apparatus 2 in step S151 described later with reference to FIG. 10.

The current information indicates the voltage or the value of the current that is caused to flow through the electric power reception antenna 101 by the electromagnetic induction caused by the magnetic field generated by the N-th electric power supply antenna 52. The identification information identifies the electric power reception apparatus 2.

In a case in which the determination in step S46 is that current information and identification information are not received from the electric power reception apparatus 2, then in step S47 the electric power supply controller 71 the measurement of the time, which was started in step S43 and which is performed by counting clock pulses supplied from the real time clock 43, has reached a predetermined value (for example, 1 sec).

If it is determined in step S47 that the predetermined time has not yet elapsed, the process returns to step S46 and the above-described process is repeated from step S46.

On the other hand, in a case in which the determination in step S47 is that the predetermined time has elapsed, the current information from the electric power reception apparatus 2 has not eventually received. That is, there is no electric power reception apparatus 2 on the electric power supply apparatus 1, and thus in step S48 the electric power supply controller 71 sets a flag to indicate that the electric power reception unit 21 of the electric power reception apparatus 2 is not located on the placement surface 1a, at a position corresponding to the N-the electric power supply unit 11. More specifically, for example, the electric power supply controller 71 sets the flag in the memory 42 to "01" to indicate that the electric power reception unit 21 of the electric power reception apparatus 2 is not present at the location corresponding to the N-th electric power supply unit 11.

After step S48 is completed, the process proceeds to step S52.

In a case in which the determination in step S45 is that the current value is equal to or greater than the threshold value THa, it is concluded that an overcurrent is flowing through the electric power supply antenna 52 of the N-th electric power supply unit 11, and thus in step S49 the electric power supply controller 71 sets a flag to indicate that there is a foreign substance 201 on the placement surface 1a, at a location corresponding to the location of the N-th electric power supply unit 11. More specifically, for example, the electric power supply controller 71 sets the flag in the memory 42 to "10" to indicate that the foreign substance 201 is present on the placement surface 1*a*, at the location corresponding to the location of the N-th electric power supply unit 11.

After step S49 is completed, the process proceeds to step S52.

If the determination in step S46 is that current information and identification information have been received from the electric power reception apparatus 2, then in step S50, the electric power supply controller 71 determines whether the current value indicated by the current information is equal to or greater than a threshold value THb.

In a case in which the determination in step S50 is that the current value indicated by the current information is equal to or greater than a threshold value THb, it is concluded that electric power is being supplied from an electric power supply unit 11 located within a range of the electric power reception unit 21 (the electric power reception antenna 101) of the electric power reception apparatus 2, and thus in step S51 the electric power supply controller 71 sets the flag to indicate that the electric power reception unit 21 of the electric power reception apparatus 2 is present on the placement surface 1*a*, at a location corresponding to the N-the electric power supply unit 11, and the electric power supply controller 71 sets the identification information so as to indicate the electric power reception unit 21 of the electric power reception apparatus 2. More specifically, for example, the flag in the memory 42 is set to "11" to indicate that the electric power reception unit 21 of the electric power reception apparatus 2 is present on the placement surface 1*a*, at a location corresponding to the N-the electric power supply unit 11, and the identification information is set so as to indicate the electric power reception unit 21 of the electric power reception apparatus 2.

In step S52, the electric power supply controller 71 stops the generation, which was started in step S42, of the weak magnetic field by the N-th electric power supply unit 11. More specifically, the electric power supply controller 71 supplies a control signal to the switch 51 via the selector 72 to turn off the switch 51.

In step S53, the electric power supply controller 71 increments the variable N by 1. For example, when the current value of the variable N is "1", the electric power supply controller 71 increments the variable N to "2".

In step S54, the electric power supply controller 71 determines whether the current value of the variable N is equal to or smaller than the total number of electric power supply units 11, that is whether N≤the total number of electric power supply unit 11.

If the determination in step S54 is that the current value of the variable N is equal to or smaller than the total number of electric power supply units 11, that is, if N≤the total number of electric power supply unit 11, then the process returns to step S42 to perform the above-described process on a next electric power supply unit 11.

In a case in which the determination in step S54 is that current value of the variable N greater than the total number of electric power supply units 11, that is, when N>the total number of electric power supply unit 11, the process is ended.

In a case in which the determination in step S50 is that the value of the current indicated by the current information is smaller than the threshold value THb, it is concluded that small power is being supplied to the electric power reception unit 21 of the electric power reception apparatus 2. Such a situation can occur, for example when a small current is induced in the electric power reception antenna 101 of the electric power reception unit 21 by a magnetic field generated by the electric power supply unit 11-38 whose location partially overlaps the electric power reception unit 21 as shown in FIG. 2. In this case, the processing flow jumps to step S48 to perform the above-described process.

The determination process in step S50 makes it possible for the electric power reception unit 21 of the electric power reception apparatus 2 to receive electric power only from those electric power supply units 11 that are substantially completely located within the area of the electric power reception unit 21 (the electric power reception antenna 101). In the specific example shown in FIG. 2, the electric power reception unit 21 of the electric power reception apparatus 2 receives electric power only from the electric power supply unit 11-21, the electric power supply unit 11-28, the electric power supply unit 11-29 and the electric power supply unit 11-37, whose locations are within the area of the electric power reception unit 21 (the electric power reception antenna 101). By controlling the supply of electric power such that electric power is supplied to the electric power reception unit 21 only from electric power supply units 11 whose locations are substantially entirely within the area of the electric power reception unit 21 (the electric power reception antenna 101), it becomes possible to prevent a useless magnetic field from being generated, and thus it becomes possible to supply electric power in a highly efficient manner.

For example, in the example shown in FIG. 2, the electric power supply units 11-21, 11-28, 11-29, and 11-37 are selected as electric power supply units 11 for supplying electric power to the electric power reception apparatus 2 whereby electric power is supplied efficiently as described above.

Figure 7:
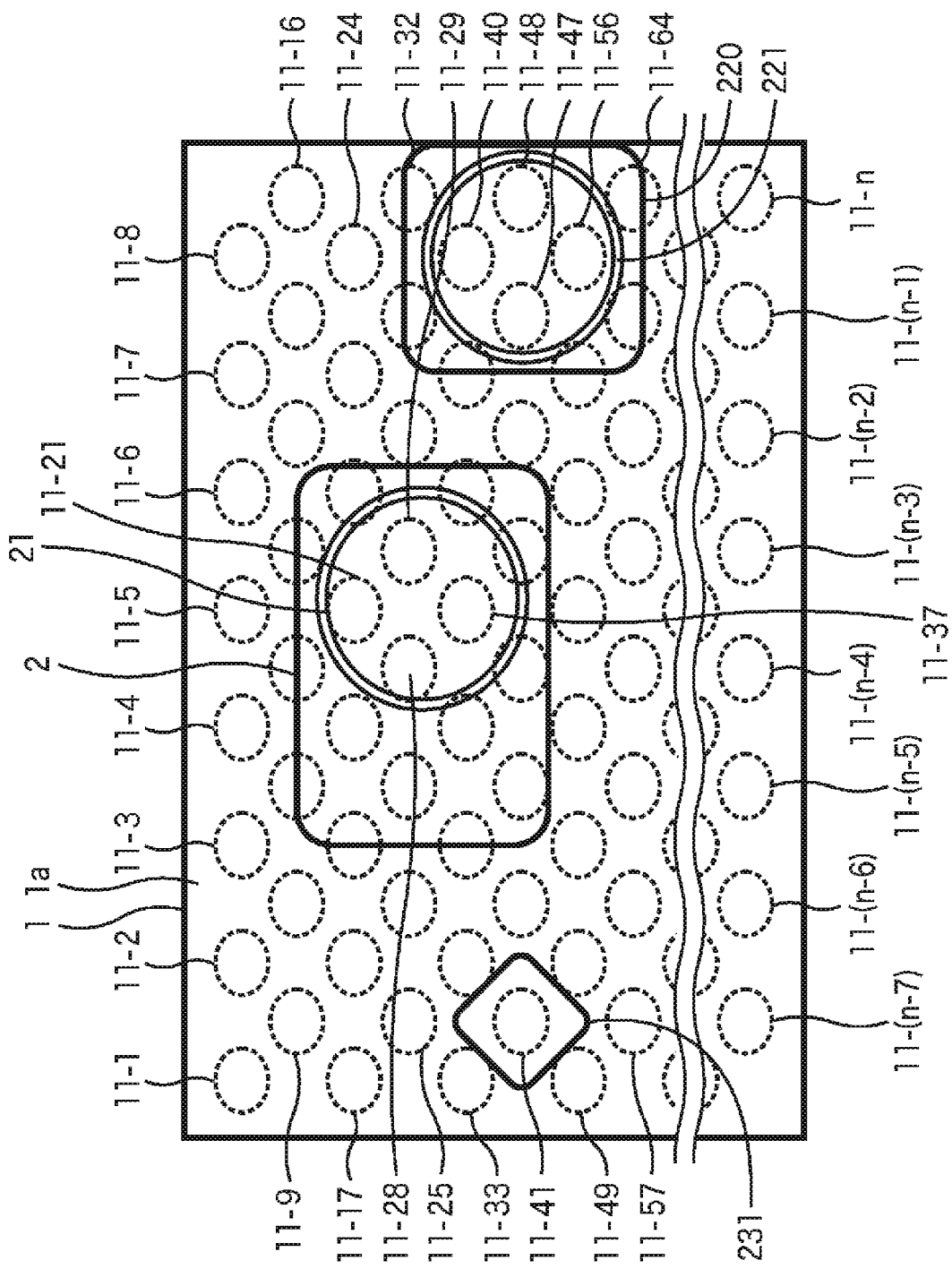
FIG. 7 is a diagram showing an electric power supply apparatus in a state in which a plurality of electric power reception apparatus and/or foreign substances are present on the electric power supply apparatus.

FIG. 7 shows the electric power supply apparatus 1 in a state in which a plurality of electric power reception apparatus and/or foreign substances are present on the electric power supply apparatus 1. In the example shown in FIG. 7, an electric power reception apparatus 2, an electric power reception apparatus 220, and a foreign substance 231 are currently present on the electric power supply apparatus 1.

The electric power reception apparatus 220 and the electric power reception unit 221 are respectively similar in structure to the electric power reception apparatus 2 and the electric power reception unit 21, and thus duplicated explanations thereof are omitted herein. The foreign substance 231 is, for example, a metal plate.

In the example shown in FIG. 7, in the process of selecting electric power supply units 11 described above with reference to the flow chart shown in FIG. 5, electric power supply units 11-21, 11-28, 11-29, and 11-37 are selected as electric power supply units 11 for supplying electric power to the electric power reception apparatus 2, and electric power supply units 11-40, 11-47, 11-48, and 11-56 are selected as electric power supply units 11 for supplying electric power to the electric power reception apparatus 220. However, for the foreign substance 231 in the form of the metal plate, no electric power supply units 11 are selected.

Next, referring to a flow chart shown in FIG. 8, a process of authenticating an electric power reception apparatus is described below. This process is started when in the process of selecting electric power supply units 11 described above with reference to the flow chart shown in FIG. 5, electric power supply units 11 are selected and the flag in the memory 42 is set so as to indicate that presence of an electric power reception unit of an electric power reception apparatus is detected.

When only one the electric power reception apparatus 2 is placed on the electric power supply apparatus 1 as in the case of the example shown in FIG. 2, the electric power supply apparatus 1 performs the authentication process described below to authenticate the electric power reception apparatus 2.

On the other hand, when the electric power reception apparatus 2 and the electric power reception apparatus 220 are placed on the electric power supply apparatus 1 as in the case of the example shown in FIG. 7, the electric power supply apparatus 1 may first perform the authentication process described below for one of the electric power reception apparatus 2 and the electric power reception apparatus 220 and then for the other one, or the electric power supply apparatus 1 may simultaneously perform the authentication process for the electric power reception apparatus 2 and the electric power reception apparatus 220.

In the case in which the electric power supply apparatus 1 performs the authentication process for a plurality of electric power reception apparatus, each electric power reception apparatus transmits identification information identifying the electric power reception apparatus to the electric power supply apparatus 1 when the electric power reception apparatus transmits data to the electric power supply apparatus 1 so that the electric power supply apparatus 1 can determine which data is received from which electric power reception apparatus based on the identification information of electric power reception apparatus stored, in step S51 shown in FIG. 5, in the memory 42.

In step S81, the electric power supply controller 71 transmits a request signal to an electric power reception apparatus via the communication unit 73 to request the electric power reception apparatus to return an ID (IDentification) as information based on which to authenticate the electric power reception apparatus. Note that the electric power reception apparatus, which should return the ID, is specified by an identification number transmitted together with the request signal.

The ID of each electric power reception apparatus may or may not be the same as the identification information of the electric power reception apparatus. In the case in which the ID of the electric power reception apparatus is the same as the identification information of the electric power reception apparatus, steps S81 to S84 may be skipped. Note that steps S81 to S84 are necessary when information different from the identification information of the electric power reception apparatus is used as the ID of the electric power reception apparatus.

In step S82, the electric power supply controller 71 starts a time measurement which is performed by counting clock pulses supplied from the real time clock 43.

In step S83, the electric power supply controller 71 determines whether the communication unit 73 has received the ID and identification information of the electric power reception apparatus, which are transmitted from the electric power reception apparatus in step S153 described later with reference to FIG. 10.

If the determination in step S83 is that the ID and the identification information of the electric power reception apparatus have not yet been received, then in step S84 the electric power supply controller 71 the predetermined time (for example, 1 sec) has elapsed since the time measurement was started in step S82.

If the determination in step S84 is that the predetermined time has not yet elapsed, the process returns to step S83 and the above-described process is repeated from step S83.

On the other hand, if the determination in step S83 is that the ID and the identification information of the electric power reception apparatus have been received, then in step S85 the electric power supply controller 71 determines whether the ID received from the electric power reception apparatus is identical to the ID assigned to the electric power supply apparatus 1. More specifically, the electric power supply controller 71 retrieves the ID from the memory 42 to determine whether the ID received from the electric power reception apparatus is identical to one of registered IDs of apparatus (that are allowed to be charged).

If the determination in step S85 is that the ID received from the electric power reception apparatus is identical to the ID assigned to the electric power supply apparatus 1, then in step S86 the electric power supply controller 71 transmits a request signal to the electric power reception apparatus to transmit electric power information associated with the electric power reception apparatus. Also in this case, the electric power reception apparatus, which should transmit electric power information, is specified by an identification number transmitted together with the request signal from the electric power supply controller 71. Note that the electric power information refers to information based on which electric power is supplied by the electric power supply controller 71. More specifically, the electric power information indicates the maximum voltage allowed in the electric power reception unit 21, the value of a current flowing into the electric power reception unit 21, and the present value of the voltage between the terminal 104 and the terminal 105.

In step S87, the electric power supply controller 71 starts a time measurement which is performed by counting clock pulses supplied from the real time clock 43.

In step S88, the electric power supply controller 71 determines whether the predetermined time (for example, 1 sec) has elapsed since the time measurement was started in step S87.

If the determination in step S88 is that the predetermined time has not yet elapsed, then in step S89 the electric power supply controller 71 determines whether the communication unit 73 has received electric power information and identification information, which are transmitted from the electric power reception apparatus in step S155 described later with reference to FIG. 10.

If the determination in step S89 is that electric power information and identification information have not yet been received from the electric power reception apparatus, the process returns to step S88 and the above-described process is repeated from step S88.

On the other hand, if the determination in step S89 is that electric power information and identification information have been received from the electric power reception apparatus, then in step S90 the electric power supply controller 71 determines whether it is allowed to supply electric power requested by the received electric power information. More specifically, based on information stored in the memory 42, the electric power supply controller 71 determines whether specifications allow supplying of requested electric power to the electric power reception apparatus.

If the determination in step S90 is that supplying of electric power to the electric power reception apparatus according to the received electric power information is allowed, then in step S91 the electric power supply controller 71 sets the flag so as to indicate that the electric power reception apparatus is a device that can be handled by the electric power supply apparatus 1. More specifically, the electric power supply controller 71 sets the flag in the memory 42 to, for example, "001", to indicate that the electric power reception apparatus is a device that can be handled by the electric power supply apparatus 1.

If it is determined in step S84 that the predetermined time has elapsed (that can occur if the electric power reception apparatus is removed from the placement surface 1a of the electric power supply apparatus 1), or if it is determined in step S85 that the ID of the electric power reception apparatus is not an ID registered in the electric power supply apparatus 1, or if it is determined step S88 that the predetermined time has elapsed (that can occur if the electric power reception apparatus is removed from the placement surface 1a of the electric power supply apparatus 1), or if it is determined step S90 that supplying of electric power to the electric power reception apparatus according to the received electric power information is not allowed, then in step S92 the electric power supply controller 71 sets the flag so as to indicate that the electric power reception apparatus is not a device that can be handled by the electric power supply apparatus 1. More specifically, the electric power supply controller 71 sets the flag in the memory 42 to, for example, "011", to indicate that the electric power reception apparatus is not a device that can be handled by the electric power supply apparatus 1.

After step S91 or step S92 is completed, the process is ended.

By determining whether the ID and the electric power information supplied from the electric power reception apparatus are consistent with information stored in the electric power supply apparatus 1 in the above-described manner, it is possible to increase the accuracy of the authentication of the electric power reception apparatus 2.

Referring to a flow chart shown in FIG. 9, a process of supplying electric power to an electric power reception apparatus is described below. This process is started when in the process of authenticating an electric power reception apparatus described above with reference to the flow chart shown in FIG. 8, the flag is set in step S91 so as to indicate that the electric power reception apparatus is an apparatus that is allowed to be handled by the electric power supply apparatus 1.

When only the electric power reception apparatus 2 is placed on the electric power supply apparatus 1 as in the case of the example shown in FIG. 2, the electric power supply apparatus 1 performs a process described below to supply electric power only to the electric power reception apparatus 2.

On the other hand, when the electric power reception apparatus 2 and the electric power reception apparatus 220 are placed on the electric power supply apparatus 1 as in the case of the example shown in FIG. 7, the electric power supply apparatus 1 may first perform the electric power supply process described below for one of the electric power reception apparatus 2 and the electric power reception apparatus 220 and then for the other one, or the electric power supply apparatus 1 may simultaneously perform the electric power supply process for the electric power reception apparatus 2 and the electric power reception apparatus 220.

In the case in which the electric power supply apparatus 1 performs the electric power supply process for a plurality of electric power reception apparatus, each electric power reception apparatus transmits identification information identifying the electric power reception apparatus to the electric power supply apparatus 1 when the electric power reception apparatus transmits data to the electric power supply apparatus 1 so that the electric power supply apparatus 1 can determine which data is received from which electric power reception apparatus, based on the identification information of electric power reception apparatus stored, in step S51 shown in FIG. 5, in the memory 42.

In step S111, based on the electric power information associated with the electric power reception apparatus and received in step S89 in FIG. 8, the electric power supply controller 71 controls the electric power supply unit 11 to generate a magnetic field to supply electric power to the electric power reception apparatus. More specifically, the electric power supply controller 71 supplies, via the selector 72, an ON control signal to the switch 51 of the selected electric power supply unit 11 corresponding to the identification information. In response, an AC current is supplied to the electric power supply antenna 52 of the electric power supply unit 11 from the power supply circuit 44, and a magnetic field is generated by a the current flowing through the electric power supply antenna 52.

Note that in the magnetic field generation process in step S111, the electric field is generated by all electric power supply units 11 identified as corresponding to the electric power reception apparatus by the identification information described in step S51 shown in FIG. 5. More specifically, in the specific case of the example shown in FIG. 2, the magnetic field is generated by the electric power supply unit 11-21, the electric power supply unit 11-28, the electric power supply unit 11-29, and the electric power supply unit 11-37.

In step S112, the electric power supply controller 71 starts a time measurement which is performed by counting clock pulses supplied from the real time clock 43.

In step S113, the electric power supply controller 71 determines whether the communication unit 73 has received a signal indicating that charging is being performed and identification information, which are transmitted from the electric power reception apparatus in step S160 described later with reference to FIG. 10.

If the determination in step S113 is that the signal indicating that charging is being performed and the identification information have not been received from the electric power reception apparatus, then in step S114 the electric power supply controller 71 determines whether the communication unit 73 has received a signal indicating that charging is completed and identification information, which are transmitted from the electric power reception apparatus in step S162 described later with reference to FIG. 10.

If the determination in step S114 is that the signal indicating that charging is completed and the identification information have not been received from the electric power reception apparatus, then in step S115 the electric power supply controller 71 determines whether the predetermined time has elapsed since the time measurement was started in step S112. More specifically, for example, the electric power supply controller 71 determines whether 90 seconds have elapsed since the time measurement was started in step S112.

If the determination in step S115 is that the predetermined time has not yet elapsed, the process returns to step S113 to repeat the process from step S113.

If the determination in step S113 is that the signal indicating that charging is being performed and the identification information have been received from the electric power reception apparatus, then in step S116 the electric power supply controller 71 resets the count of time, whose counting was started in step S112. That is, the electric power supply controller 71 resets the count of time to 0.

After step S116 is completed, the process returns to step S112, and steps S112, S113, and S116 are performed repeatedly unit the signal indicating that charging is completed is received from the electric power reception apparatus.

If it is determined in step S114 that the signal indicating that charging is completed and the identification information have been received from the electric power reception apparatus, step S115 is skipped and the process proceeds to step S117. In step S117, the electric power supply controller 71 stops the generation, which was started in step S111, of the magnetic field by the electric power supply units 11 identified by the identification information as corresponding to the electric power reception apparatus.

More specifically, the electric power supply controller 71 supplies an OFF control signal to the switch 51 of the electric power supply units 11 via the selector 72. As a result, the AC current supplied from the power supply circuit 44 to the electric power supply antenna 52 of the electric power supply units 11 is turned off, and the magnetic field generated in the electric power supply antenna 52 disappears.

Note that in step S114 described above, turning-off of the electric field is performed for all electric power supply units 11 that started generation of the electric field in step S111, that is, for all electric power supply units 11 identified as corresponding to the electric power reception apparatus by the same identification information described in step S51 shown in FIG. 5. More specifically, in the specific case of the example shown in FIG. 2, turning-off of the magnetic field is performed in step S117 for the electric power supply unit 11-21, the electric power supply unit 11-28, the electric power supply unit 11-29, and the electric power supply unit 11-37.

If it is determined in step S115, the predetermined time (for example, 90 sec) has elapsed since the time measurement was started in step S112, it is concluded that the electric power reception apparatus has been removed from the placement surface 1a of the electric power supply apparatus 1, and thus the processing in step S117 is performed in the above-described manner. That is, because there is no electric power reception apparatus to which to supply electric power, it is necessary to perform the process in S117 to turn off the magnetic field generated by the electric power supply units 11.

Referring to a flow chart shown in FIG. 10, a process performed by the electric power reception apparatus to receive electric power is described below. This process is started when the electric power supply apparatus 1 generates a weak magnetic field in step S42 in FIG. 5 whereby a current is electromagnetically included in the electric power reception antenna 101 of the electric power reception unit 21 at a location corresponding to electric power supply units 11, the current is supplied to the electric power reception controller 103 via the rectifier 102, and thus the electric power reception controller 103 is activated.

In step S151, the electric power reception controller 103 controls the communication unit 107 to transmit current information and identification information stored in the memory 121 to the electric power supply apparatus 1. In step S152, the electric power reception controller 103 determines whether the communication unit 107 has received a signal requesting the ID of the electric power reception apparatus.

If the determination in step S152 is that the communication unit 107 has not received the signal requesting the ID of the electric power reception apparatus, the process returns to step S151. However, if it is determined that the communication unit 107 has received the signal requesting the ID of the electric power reception apparatus, then in step S153 the electric power reception controller 103 read the ID and the identification information of the electric power reception apparatus from the memory 121 and transmits them to the electric power supply apparatus 1.

In step S154, the electric power reception controller 103 determines whether the communication unit 107 has received a signal requesting electric power information. If the determination in the step S154 is that the communication unit 107 has not received the signal requesting the electric power information associated with the electric power reception apparatus, then the process waits in step S154 until the signal requesting the electric power information associated with the electric power reception apparatus is received.

If it is determined in step S154 that the communication unit 107 has received the signal requesting the electric power information associated with the electric power reception apparatus, then in step S155 the electric power reception controller 103 controls the communication unit 107 to transmit the electric power information and the identification information.

In step S156, the electric power reception controller 103 starts charging of the battery 123. More specifically, the electric power reception controller 103 turns on the switch 106 such that an AC current is supplied from the electric power reception antenna 101 to the rectifier 102, and a DC current produced by the rectifier 102 by rectifying the AC current is passed through a path including the terminal 104, the battery 123, the terminal 105, and the switch 106 thereby charging the battery 123.

In step S157, the electric power reception controller 103 starts counting of clock pulses supplied from the real time clock 122 to measure the elapse of time. In step S158, the electric power reception controller 103 determines whether a predetermined time (for example, 1 min) has elapsed since the counting of time was started in step S157.

If the determination in step S158 is that the predetermined time (for example, 1 min) has not yet elapsed, then in step S159 the electric power reception controller 103 determines whether charging of the battery 123 is completed. More specifically, the electric power reception controller 103 determines whether the voltage between the terminal 104 and the terminal 105 has reached a value indicating that the charging of the battery 123 is completed.

If it is determined in step S159 that the charging is not completed, the process returns to step S158 to repeat the above-described process.

If it is determined in step S158 that the predetermined time (for example, 1 min) has elapsed, then in step S160 the electric power reception controller 103 controls the communication unit 107 to transmit, to the electric power supply apparatus 1, the identification information and a signal indicating that the charging is being performed.

In step S161, the electric power reception controller 103 resets the count value of the time whose counting was started in step S157. That is, the electric power reception controller 103 resets the count value of the time to 0.

After step S161 is completed, the process returns to step S157.

If it is determined in step S159 that the charging of the battery 123 is completed, then in step S162, the electric power reception controller 103 controls the communication unit 107 to transmit to the electric power supply apparatus 1 identification information and a signal indicating that the charging is completed.

In step S163, the electric power reception controller 103 ends the charging of the battery 123 by turning off the switch 106.

As described above, to one electric power reception unit 21, electric power is supplied from a plurality of electric power supply units 11 at locations corresponding to the location of the electric power reception unit 21, and thus it is possible to quickly charge the electric power reception unit 21.

Furthermore, it is possible to detect a foreign substance 201 such as a metal substance present on the electric power supply apparatus 1, and it is possible to prevent the foreign substance 201 from being heated and prevent a overcurrent from flowing through the electric power supply antenna 52 of the electric power supply unit 11, thereby ensuring that electric power is supplied to the electric power reception apparatus in a highly safe manner.

Because electric power is wirelessly supplied to the electric power reception apparatus 2 without using a connector, it is possible to supply electric power to a plurality of electric power reception apparatus, regardless of specifications thereof in terms of voltage and/or current.

If the electric power reception apparatus 2 transmits information indicating the size of the electric power reception unit 21 (the electric power reception antenna 101) to the electric power supply apparatus 1, it becomes unnecessary, in the process of selecting electric power supply units 11 shown in FIG. 5, to sequentially scan all electric power supply unit 11 to detect electric power supply units 11 at locations corresponding to the location of the electric power reception unit 21.

More specifically, based on the size of the electric power reception unit 21, a weak magnetic field is generated only by electric power supply units 11 in a small area adjacent to a first-detected electric power supply unit 11, and correct electric power supply units 11 are detected simply by determining whether electric power supply units 11 are at locations corresponding to the location of the electric power reception unit 21. Thus it is possible to quickly detect electric power supply units 11 at locations corresponding to the electric power reception unit 21.

FIG. 11 is diagram showing another example of a construction of the electric power reception unit of the electric power reception apparatus 2. In this electric power reception apparatus 2, an electric power reception unit 321-1 and an electric power reception unit 321-2 are similar in structure to the electric power reception unit 21. Both the electric power reception unit 321-1 and the electric power reception unit 321-2 are connected to the battery 123 of the electric power reception unit 21 so that electric power is supplied to the battery 123 from both the electric power reception unit 321-1 and the electric power reception unit 321-2.

As shown in FIG. 11, each of the electric power reception unit 321-1 and the electric power reception unit 321-2 is formed to have a size that can contain only one electric power supply unit 11.

The electric power reception apparatus 2 is placed on the placement surface 1a of the electric power supply apparatus 1 such that the electric power reception unit 321-1 and the electric power reception unit 321-2 are at locations respectively corresponding to the locations of the electric power supply unit 11-21 and the electric power supply unit 11-36 so that the electric power reception unit 321-1 and the electric power reception unit 321-2 respectively receive electric power from the electric power supply unit 11-21 and the electric power supply unit 11-36.

In the following discussion, the electric power reception unit 321-1 and the electric power reception unit 321-2 will be referred to simply as electric power reception units 321 when it is not necessary to distinguish them from each other.

By constructing the electric power reception apparatus 2 so as to have a plurality of electric power reception units 321 as described above, it becomes possible for the electric power reception apparatus 2 to receive electric power from a plurality of electric power supply units 11. Thus, as with the electric power reception apparatus 2 shown in FIG. 2, the electric power reception apparatus 2 described above with reference to FIG. 11 is capable of completing the reception of electric power.

If the electric power reception apparatus 2 shown in FIG. 11 notifies the electric power supply apparatus 1 of the number of electric power reception units 321 and the distance between electric power reception units 321, that is, the distance between the center of the electric power reception unit 321-1 and the center of the electric power reception unit 321-2, then, in the process of selecting electric power supply units 11 (FIG. 5), it becomes unnecessary to detect electric power supply units 11 at locations corresponding to the locations of the electric power reception units 321 by sequentially scanning all electric power supply units 11.

More specifically, for example, electric power supply units 11 at locations that are likely to allow it to supply electric power to the respective electric power reception units 321 are detected on the basis of the locations of a first-detected electric power supply unit 11, the number of electric power reception units 321, and the distance between electric power reception units 321. Thereafter, a weak magnetic field is generated by each detected electric power supply unit 11, and a judgment is performed as to whether electric power supply units 11 are at locations corresponding to the locations of the electric power reception units 321 whereby electric power supply units 11 to be used to supply electric power to the electric power reception units 231 are determined. This makes it possible to quickly determine electric power supply units 11 at locations corresponding to the locations of the electric power reception unit 321.

Because the electric power supply apparatus has the capability of wirelessly supplying electric power without using a cable, it is possible to easily supply electric power to electric power reception apparatus regardless of specifications thereof in terms of voltage and/or current. As described above, the electric power supply apparatus is capable of easily and efficiently supplying electric power such that a plurality of electric power supply means supply electric power by electromagnetic induction to the electric power reception apparatus, the selection means selects, from the total plurality of electric power supply means, a plurality of electric power supply means whose location corresponds to the position where the electric power reception apparatus is placed, the receiving means receives the control information for controlling the supply of the electric power, the control information being wirelessly transmitted from the electric power reception apparatus, and the control means controls the supply of the electric power according to the control information such that the electric power is supplied to the electric power reception apparatus from the selected plurality of electric power supply means. The electric power reception apparatus receives electric power such that the electric power reception means receives the electric power supplied by the electromagnetic induction from the selected plurality of electric power supply means, and the transmitting unit wirelessly transmits the control information when the supply of electric power by the electromagnetic induction from the selected plurality of electric power supply means is received.

The sequence of processing steps described above may be performed by means of hardware or software. When the processing sequence is executed by software, a program forming the software may be installed from a storage medium onto a computer which is provided as dedicated hardware or may be installed onto a general-purpose personal computer capable of performing various processes in accordance with various programs installed thereon.

A specific example of a storage medium usable for the above purpose include is a removable medium 82 (shown in FIG. 3) such as a magnetic disk (such as a floppy disk), an optical disk (such as a CD-ROM (Compact Disk-Read Only Memory) and a DVD (Digital Versatile Disk)), a magnetooptical disk (such as a MD (Mini-Disk, trademark)), and a semiconductor memory, in the form of a package medium in which a program is stored and which is supplied to a user separately from a computer. A program may also be supplied to a user by preinstalling it on a memory 42 or a hard disk disposed in the computer.

The program for executing the processes may be installed on the computer, as required, via an interface such as a router or a modem by downloading via a wired or wireless communication medium such as a local area network, the Internet, or digital satellite broadcasting.

In the present description, the steps described in the program stored in the storage medium may be performed either in time sequence in accordance with the order described in the program or in a parallel or separate fashion.

In the present description, the term "system" is used to describe a whole of a plurality of apparatus organized such that they function as a whole.

It should be understood by those skilled in the art that various modifications, combinations, sub-combinations and alterations may occur depending on design requirements and other factors insofar as they are within the scope of the appended claims or the equivalents thereof.

What is claimed is:

1. An electric power supply device, comprising:
   at least one electric power supply section configured to supply electric power to at least one electric power reception device wirelessly;
   a selection section configured to select the at least one electric power supply section for the supply of the electric power to the at least one electric power reception device wirelessly, wherein a location of the selected at least one electric power supply section is entirely within an area of the electric power reception device;
   a detection section configured to detect a foreign substance; and
   a control section configured to stop the electric power supplied to the at least one electric power reception device based on a presence of the foreign substance on a surface of the at least one electric power supply section, wherein the foreign substance is in contact with the surface of the at least one electrical power supply section.

2. The electric power supply device according to claim 1, further comprising a communication section configured to transmit or receive control information to control the supply of the electric power to the at least one electric power reception device, wherein the control section is further configured to transmit and receive information to or from the electric power reception device via the communication section to authenticate the electric power reception device.

3. The electric power supply device according to claim 1, further comprising a communication section configured to transmit or receive control information to control the supply of the electric power to the at least one electric power reception device,
   wherein based on reception of information by the communication section from the electric power reception device, the selection section is further configured to select the at least one electric power supply section as a first electric power supply section at the location, and
   wherein the at least one electric power supply section is further configured to generate a magnetic field at a point of time at which the communication section received the information.

4. The electric power supply device according to claim 3, wherein the control information is wirelessly transmitted from the electric power reception device such that the electric power is supplied to the electric power reception device from the selected at least one electric power supply section.

5. The electric power supply device according to claim 1, further comprising a communication section configured to transmit or receive control information to control the supply of the electric power to the at least one electric power reception device,
   wherein the detection section is further configured to detect an overcurrent that flows through the at least one electric power supply section,
   wherein based on the detection of the overcurrent by the detection section before reception of information by the communication section, the selection section is further configured to restrict the selection of the at least one electric power supply section through which the detected overcurrent flows, and
   wherein the information indicates the supply of the electric power to the at least one electric power reception device.

6. The electric power supply device according to claim 1, wherein the at least one electric power supply section includes at least one coil.

7. The electric power supply device according to claim 6, wherein the at least one coil is further configured to generate a magnetic field.

8. The electric power supply device according to claim 1, further comprising a communication section configured to transmit or receive control information to control the supply of the electric power to the at least one electric power reception device.

9. The electric power supply device according to claim 1, wherein the control section is further configured to control the supply of the electric power based on control information.

10. An electric power reception device, comprising:
    at least one electric power reception section configured to receive electric power supplied by at least one electric power supply section of an electric power supply device, wherein a location of the at least one electric power supply section is entirely within an area of the electric power reception device;
    a detection section configured to detect a foreign substance; and
    a control section configured to transmit information to indicate the foreign substance to the electric power supply device based on a presence of the foreign substance on a surface of the at least one electric power reception section, wherein the foreign substance is in contact with the surface of the at least one electric power reception section.

11. The electric power reception device according to claim 10, further comprising a communication section configured to transmit or receive the information to control the supply of the electric power, wherein, the control section is further configured to transmit and receive the information to or from the electric power supply device via the communication section to authenticate the electric power reception device.

12. The electric power reception device according to claim 10, wherein the electric power supply device includes at least one coil.

13. The electric power reception device according to claim 12, wherein the at least one coil is further configured to generate a magnetic field.

14. The electric power reception device according to claim 10, further comprising a communication section configured to transmit or receive the information to control the supply of the electric power.

15. The electric power reception device according to claim 10, wherein the control section is further configured to periodically transmit the information based on determination of the supply of the electric power from the electric power supply device.

* * * * *